(12) United States Patent
Tarumi

(10) Patent No.: US 8,488,174 B2
(45) Date of Patent: Jul. 16, 2013

(54) PRINT CONTROL APPARATUS, PRINT CONTROL METHOD, AND STORAGE MEDIUM FOR CONFIGURING OUTPUT DEVICE BASED ON ACQUIRED INFORMATION

(75) Inventor: Takeshi Tarumi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 158 days.

(21) Appl. No.: 13/254,424

(22) PCT Filed: Apr. 27, 2011

(86) PCT No.: PCT/JP2011/002490
§ 371 (c)(1),
(2), (4) Date: Sep. 1, 2011

(87) PCT Pub. No.: WO2011/138859
PCT Pub. Date: Nov. 10, 2011

(65) Prior Publication Data
US 2012/0026551 A1 Feb. 2, 2012

(30) Foreign Application Priority Data
May 6, 2010 (JP) .................................. 2010-106260

(51) Int. Cl.
*G06F 3/12* (2006.01)
(52) U.S. Cl.
USPC .......................................... 358/1.15; 719/321
(58) Field of Classification Search
USPC .......................................... 358/1.15; 719/312
See application file for complete search history.

(56) References Cited

U.S. PATENT DOCUMENTS

| 7,383,554 B2 | 6/2008 | Ozaki et al. |
| 2009/0094604 A1 | 4/2009 | Sakai |
| 2010/0083284 A1* | 4/2010 | Onsen ........................... 719/321 |

FOREIGN PATENT DOCUMENTS

| JP | 2000-194514 A | 7/2000 |
| JP | 2004-21400 A | 1/2004 |
| JP | 2006-209430 A | 8/2006 |
| JP | 2009-93226 A | 4/2009 |

OTHER PUBLICATIONS

"HP Universal Print Driver Series for Windows—overview and features",<http://h20338.www2.hp.com/hpsub/cache/342988-0-0-225-121.html> (2010).

* cited by examiner

*Primary Examiner* — Qian Yang
(74) *Attorney, Agent, or Firm* — Fitzpatrick, Cella, Harper & Scinto

(57) ABSTRACT

To enable printing using an arbitrary type of printer without functional limitation by a user merely specifying the printer to be used from the provided printers. When executing print processing with a virtual printer driver 126, an output device identification processing unit 1251 that identifies an output device, and a printer driver management processing section 1252 that executes preparation processing and organizing processing for print processing with the virtual printer driver 126 are provided. The printer driver management processing section 1252 during a preparation processing acquires hardware information for the output device, searches for a corresponding printer driver that based on the hardware information, and installs a dedicated or a generic printer driver identified by searching. The printer driver management processing section 1252 during the organizing processing determines whether configuration information of the output device is required. When configuration information for the output device is required, the printer driver management processing unit determines whether the configuration information has been acquired. When the configuration information for the output device has not been acquired, the configuration information for the output device is acquired.

10 Claims, 22 Drawing Sheets

Fig. 19

```
<psf:Feature name="psk:JobHolePunch">
    <psf:Property name="psk:DisplayName">
        <psf:Value xsi:type="xsd:string">Punch hole</psf:Value>
    </psf:Property>
    <psf:Property name="psf:SelectionType">
        <psf:Value xsi:type="xsd:QName">psk:PickOne</psf:Value>
    </psf:Property>
    <psf:Option name="psk:BottomEdge" constrained="psk:DeviceSettings">
        <psf:Property name="psk:DisplayName">
            <psf:Value xsi:type="xsd:string">Bottom Edge</psf:Value>
        </psf:Property>
    </psf:Option>
```

16000
16001
16002

PRINT CONTROL APPARATUS, PRINT CONTROL METHOD, AND STORAGE MEDIUM FOR CONFIGURING OUTPUT DEVICE BASED ON ACQUIRED INFORMATION

TECHNICAL FIELD

The present invention relates to a print control apparatus, a print control method and a storage medium. More specifically, the present invention relates to enabling efficient printing simply by specification by a user of the objects to be used from the objects provided in a printer and without a requirement for an installing operation.

BACKGROUND ART

Generally, when using a peripheral device such as a printer by use of an information processing apparatus such as a personal computer, a device driver (in the case of a printer, a printer driver) specifically adapted to the peripheral device must be used. Therefore, when a plurality of printers is used in a conventional configuration, a printer driver must be included for use in relation to for each printer unit. Consequently, on each such occasion, a user is forced to execute a cumbersome installation operation including steps such as checking an IP address and then searching for a complying printer driver.

In recent years, research has progressed in relation to a "virtual printer driver" that is a common-use printer driver that can be used without reference to a printer type. For example, Non-Patent Literature 1 discloses a method of printing by selection of a network printer that can execute output after a print command is given from an application to a virtual printer driver. This method enables use of all printers that comply with the virtual printer driver simply by merely including in advance a virtual printer driver in the information processing apparatus.

CITATION LIST

Non Patent Literature

NPL 1: "HP Universal Print Driver Series for Windows—overview and features", internet <http://h20338.www2.hp.com/hpsub/cache/342988-0-0-225-121.html>

However, the virtual printer driver shown in Non-Patent Literature 1 generates and sends a command in a format that can be processed in common by all complying printers. Therefore, functionality is limited in comparison to a configuration in which printing is executed by use of a dedicated printer driver that is specifically adapted to each printer. Furthermore printing is not possible in relation to a type of printer which cannot process a command sent by the virtual printer driver.

SUMMARY OF INVENTION

The present invention provides a print control apparatus, a print control method and a storage medium that enable use of an arbitrary type of printer without functional limitation by a user merely specifying the objects for use from those objects provided in a printer.

The print control apparatus according to the present invention includes an output device identification processing unit configured to identify an output device when executing print processing with a virtual printer driver, and a printer driver management processing unit configured to execute preparation processing and organizing processing for print processing with the virtual printer driver. The printer driver management processing unit during the preparation processing acquires hardware information for the output device, searches for a corresponding printer driver that based on the hardware information, and installs a dedicated or a generic printer driver identified by searching. In addition, the printer driver management processing unit in the organizing processing, determines whether configuration information of the output device is required. When configuration information for the output device is required, the printer driver management processing unit determines whether the configuration information has been acquired. When the configuration information for the output device has not been acquired, the configuration information for the output device is acquired.

According to the present invention, a printer driver that is optimal for the printer identified as the output destination is automatically installed at that location by the virtual printer driver. Therefore, when acquisition of the configuration information for a printer is required, use of the functions of an arbitrary type of printer is possible without a requirement for a cumbersome installation operation by a user.

Further features of the present invention will become apparent from the following description of exemplary embodiments with reference to the attached drawings.

BRIEF DESCRIPTION OF DRAWINGS

FIG. 19 describes the description for determining whether or not configuration information for the output device is required.

DESCRIPTION OF EMBODIMENTS

Figure 1:
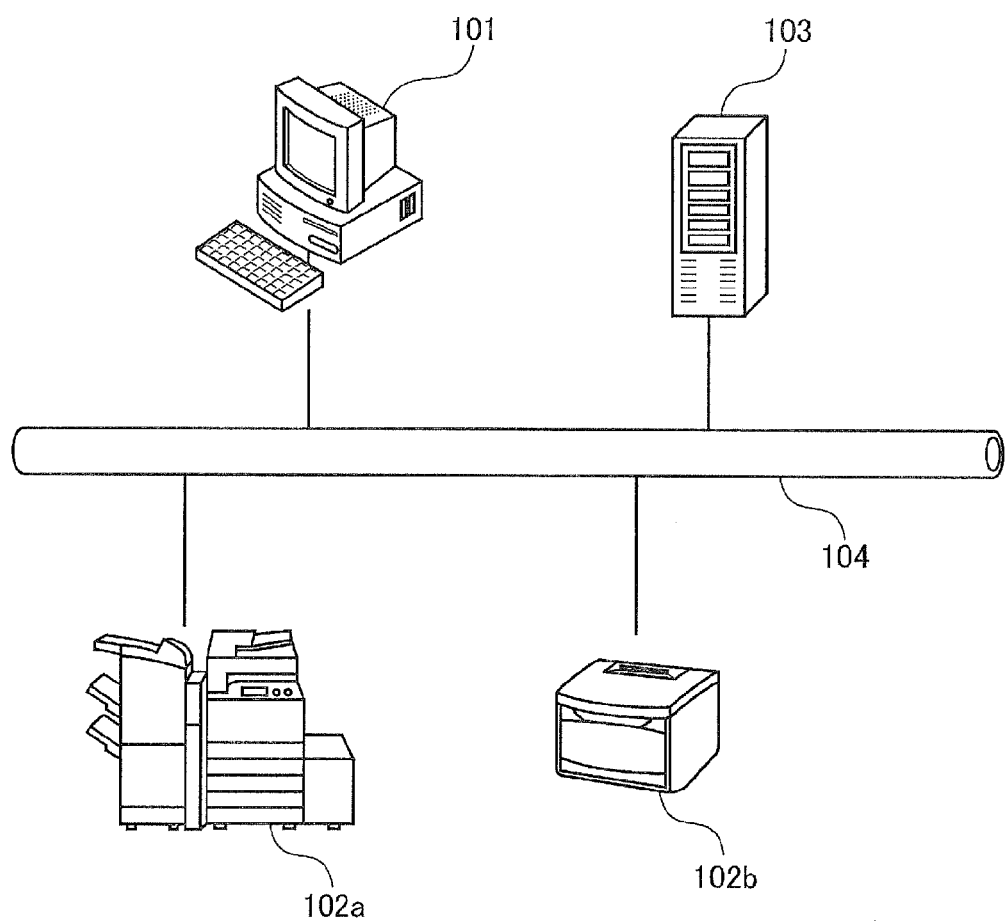
FIG. 1 is a block diagram that illustrates a schematic configuration of a system according to a first embodiment of the present invention.

The preferred embodiment for execution of the present invention will be described below with reference to the figures. FIG. 1 is a block diagram that illustrates a schematic configuration of a print control apparatus and an overall system according to a first embodiment of the present invention. The network system includes a host computer 101, a plurality of output devices 102a, 102b, . . . at execute printing operation upon receipt of print data from the host computer 101, and a printer driver transmission server 103. These components are connected by a network 104.

Figure 2:
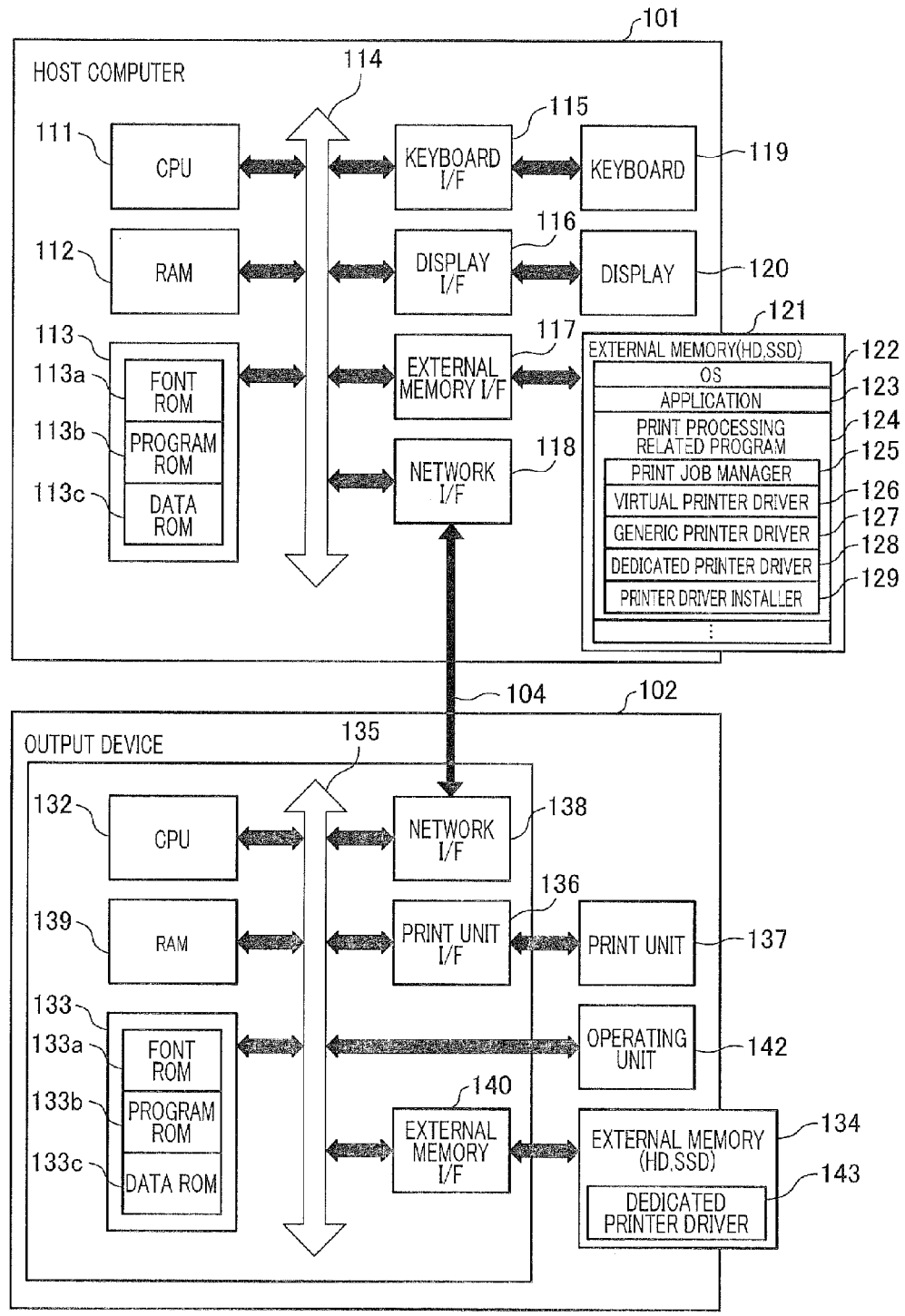
FIG. 2 is a block diagram that illustrates a configuration of a host computer and an output device.

FIG. 2 is a block diagram that illustrates a configuration of the host computer 101 and the output device 102 in FIG. 1. In the host computer 101, the CPU 111 executes overall control of each device connected to a system bus 114 according to a program stored in a RAM 112. The RAM 112 functions as a main memory for a CPU 11, a work area, or the like.

A ROM 113 stores various types of programs and data. The ROM 113 is configured by division into a font ROM 113a that stores various types of fonts, a program ROM 113b that stores boot programs, BIOS, or the like, and a data ROM 113c that stores various types of data.

A keyboard controller I/F 115 controls key input from a keyboard 119 or a pointing device (mouse) (not shown). A display I/F 116 controls display operations on a display 120. An external memory I/F 117 controls access with an external memory 121 such as a semiconductor memory disk (solid state disk (SSD)), or the like. The external memory 121 functions as a storage medium that can be read by a computer. The external memory 121 principally stores the operating system program (hereinafter referred to as "OS") 112, and various types of applications 123, print processing related programs 124, in addition to user files, edit files and the like (not shown). Microsoft Windows (Registered Trademark) may be used herein as the OS 122.

The print processing related programs 124 include a print job manager 125, a virtual printer driver 126, a generic printer driver 127, a dedicated printer driver 128, and a printer driver installer 129. The virtual printer driver is a program used for indirect printing of a document by a physical output device. The denotation "virtual" indicates the indirect nature of the program. Since the virtual printer driver 126 is registered as a general printer driver on the OS 122, the user can execute operations that closely resemble a normal printing operation sequence.

The generic printer driver 127 and the dedicated printer driver 128 are categorized as a general actualizing printer driver. An actualizing printer driver is a component that converts a print request from an application into language that can be interpreted by a physical output device. More specifically, the generic printer driver 127 is a printer driver that enables printing by a plurality of device models. The generic printer driver 127 enables use of functions that are common to the corresponding device model. The dedicated printer driver 128 is a printer driver that complies with only one device model. The dedicated printer driver 128 enables maximization of a corresponding device model function.

The network I/F 118 is connected to the output device 102 through the network 104, and executes communication control processing with the output device 102. Note that the printer driver transmission server 103 (refer to FIG. 1) also includes an apparatus configuration that is the same as the host computer 101.

Next, the configuration of the output device 102 will be described. A CPU 132 controls the overall operation of the output device 102. A RAM 139 functions as a principal memory, work area, or the like of the CPU 132, and may be also used as an output information development region, or environment data storage region. Furthermore, the RAM 139 includes a non-volatile RAM (NVRAM) region, and is configured to enable expansion of the memory capacity by an optional RAM that is connected to an expansion port (not shown). The ROM 133 includes a font ROM 133a that stores various types of fonts, a program ROM 133b that stores control programs or the like for execution by the CPU 132, and a data ROM 133c that stores various types of data.

The network I/F 138 executes sending and receiving of data with the host computer 101. The print unit OF 136 controls the interface with the print unit 137 that is the printer engine. The access with the external memory 134 is controlled by the external memory I/F 140. The external memory 134 includes a hard disk (HD) that is optionally connected, and a semiconductor memory disk (solid state disk (SSD)), or the like. The external memory 134 stores font data, emulation programs, form data, and the like. Furthermore, the external memory 134 can store a dedicated printer driver 143 according to the present embodiment.

Note that when the external memory 134 such as a hard disk or the like is not connected, the data ROM 133c of the ROM 133 stores information for use in the host computer 101 or the like. The number of external memories 134 is not limited to one, and a plurality of memories may be provided. For example, a plurality of external memories may be connected to store a program that interprets a printer control language of a different language system, an optional font card in addition to the internally-stored fonts, and the like.

An operating unit 142 includes an operating panel for receiving operations from a user. The operating panel includes a switch and a LED display device or the like for such operations (not shown). The operating unit 142 includes a NVRAM (not shown), and may be adapted to store printer mode setting information from the operating panel.

The CPU 132 outputs an image signal as output information to the print unit 137 through the print unit I/F 136 based on the control program or the like stored in the program ROM 133b of the ROM 133. The CPU 132 enables communication processing with the host computer 101 through the network I/F 138. The CPU 132 is configured to receive print data sent from the host computer 101 and to enable transmission of the information or the like in the output device 102 to the host computer 101.

Figure 3:
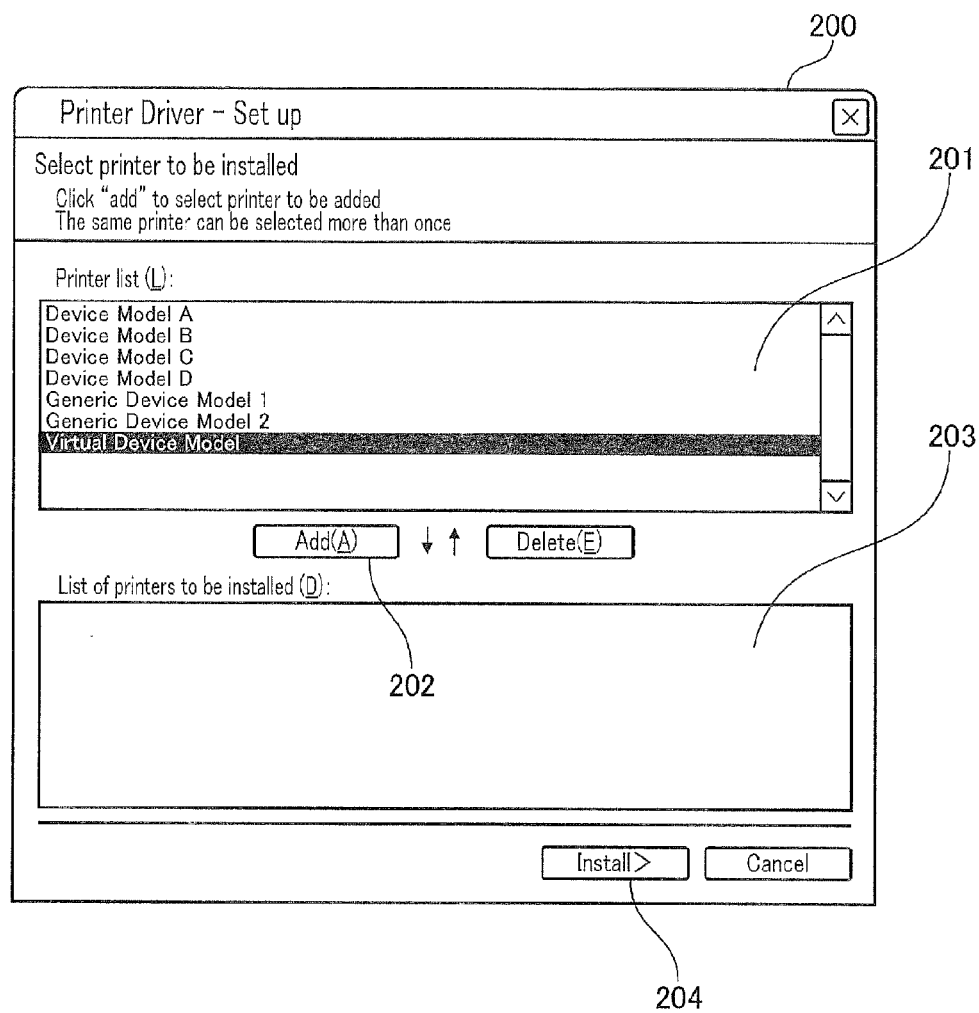
FIG. 3 describes a user interface.

FIG. 3 describes a user interface 200 that includes the printer driver installer illustrated in FIG. 2. When the printer driver installer 129 is executed, the user interface 200 is displayed on the display 120.

A printer list 201 displays a list of printer drivers that can be installed. The language "Device Model A" in the printer list 201 is a dedicated printer driver that is compliant with the output device of the device model A. The "Device Model. B" is a dedicated printer driver that is compliant with the output device of device model B. The "Device Model C" is a dedicated printer driver that is compliant with the output device of device model C. The "Device Mode D" is a dedicated printer driver that is compliant with the output device of device model D. The "Generic Device Model 1" is a generic printer driver that is compliant with device models A and B. The "Generic Device Model 2" is a generic printer driver that is compliant with device models C and D. The "Virtual Device Model" is a virtual printer driver that is capable of compliance not only with the device models A, B, C and D, but with all output devices.

When a user selects an arbitrary model and presses the add button 202, the selected model is added to the installed printer list 203. The printer driver installer 129 installs a printer driver for the designated model by pressing the install button 204.

Figure 4:
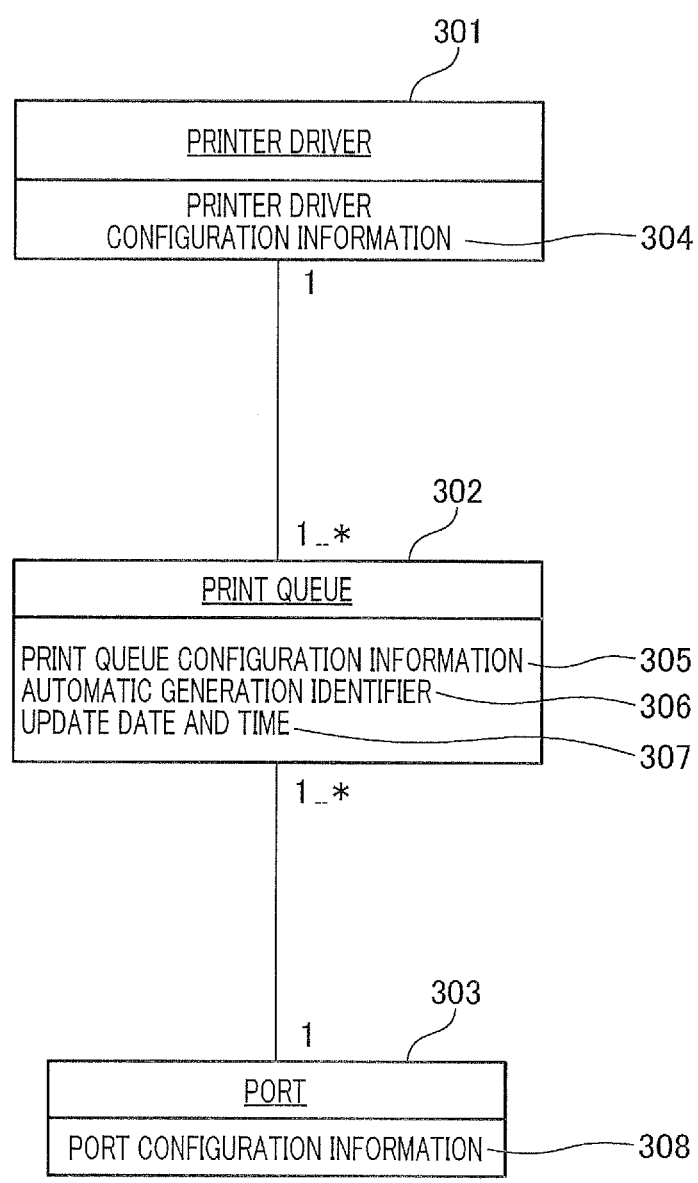
FIG. 4 is an object chart related to a printer driver, a printer queue, and a port.

FIG. 4 illustrates various types of information related to a printer driver, a printer queue, and a port, and the relationship between such information types. In FIG. 4, each type of information in the printer driver, the printer queue, and the port are expressed using a unified modeling language (UML) object chart.

In FIG. 4, the print queue 302 is a print object when printing using an application. A plurality of print queues 302 may be prepared from the printer driver of the same device model. For example, it is assumed that three "Device Model A" output devices are introduced into the office. In this case, one printer driver that is adapted to "Device Model A" is installed, and three print queues are prepared using that printer driver.

A port 303 is an object for specifying the output destination of the network. The relationship between the print queue and the port is normally one-to-one. However, the same port as shown in the figure may use a plurality of print queues.

The printer driver 301 retains printer driver configuration information 304. The printer driver configuration information 304 is configured from a driver version, a device model name, hardware information, a driver module name, and the like. The printer driver configuration information 304 is managed by the OS 122.

The print queue 302 retains the print queue configuration information 305. The print queue configuration information 305 is configured from a printer queue name, a port name, a printer setting information, a job input time, a job status, and the like. The print queue configuration information 305 is managed by the OS 122. Furthermore, the print queue 302 also retains the automatic generation identifier 306 and the update time and date 307. This information is managed by the printer job manager 125. Further details are described below.

The port 303 retains the port configuration information 308. The port configuration information 308 is configured from a port name, a module name, an IP address, and the like. The port configuration information 308 is managed by the OS 122.

Figure 5:
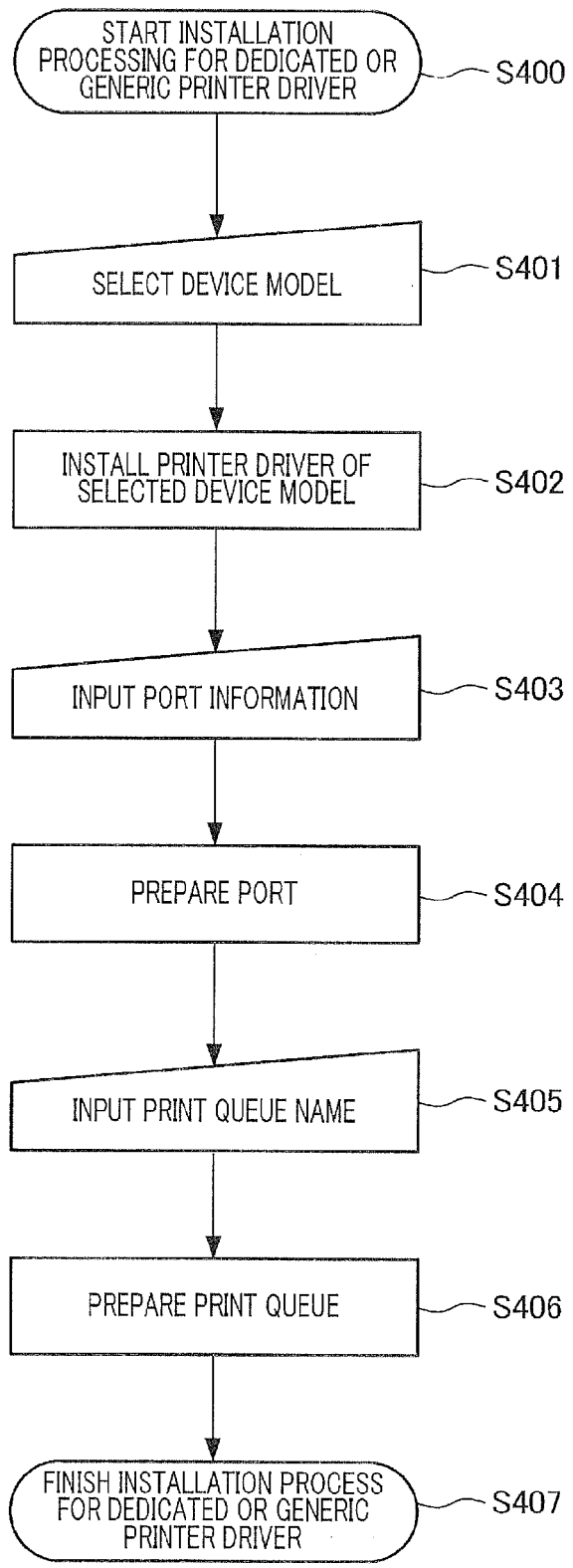
FIG. 5 is a flowchart of the installation process for a printer driver.

FIG. 5 is a flowchart of the installation process for a general printer driver by the printer driver installer 129 in FIG. 2. A general printer driver is a dedicated printer driver or a generic printer driver.

In FIG. 5, when installation of the printer driver is commenced (step S400), the printer driver installer 129 firstly receives the user selection of the device model (step S401). At this point, it is assumed that a device model other than "Virtual Device Model" is selected from the printer list 201 in FIG. 3. The installation process including selection of "Virtual Device Model" is described using FIG. 6 below.

When selection of a dedicated printer driver or a generic printer driver is received, the printer driver installer 129 installs the printer driver for the selected device model (step S402). Next, the printer driver installer 129 receives input from a user of port information such as the IP address (step S403), and prepares the port (step S404). Next, printer driver installer 129 receives input of the print queue name from the user (step S405). The printer driver installer 129 allocates the port prepared in step S404 and the printer driver installed in step S402 to prepare the print queue (step S406). At this point, management of the dedicated printer driver or a generic printer driver is finished (step S407).

Figure 6:
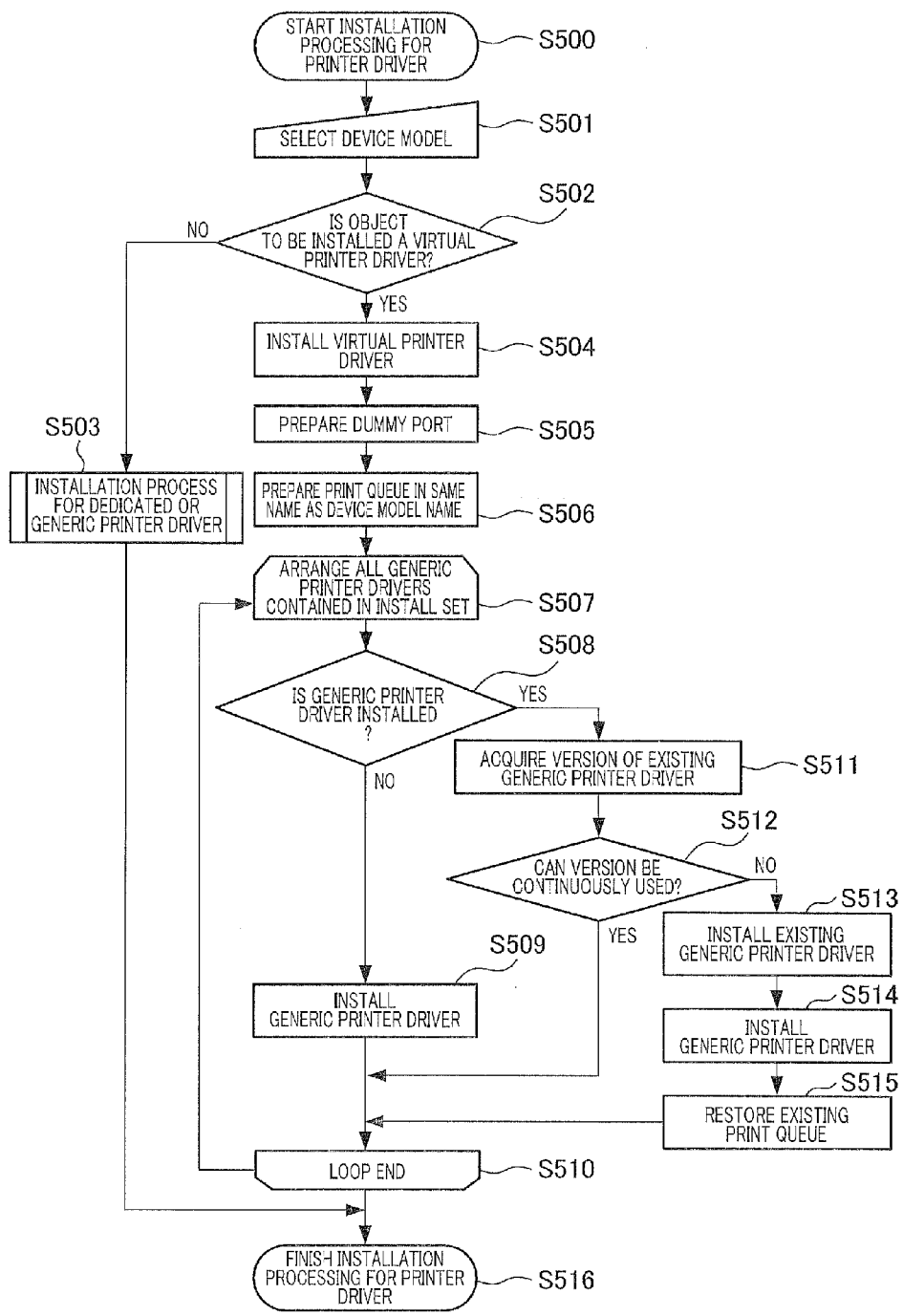
FIG. 6 is a flowchart of the installation process for a printer driver.

FIG. 6 is a flowchart of the installation process for a printer driver by a printer driver installer 129. At this point, an installation process also including selection of "Virtual Device Model" is executed. In FIG. 6, installation of the printer driver is commenced (step S500). The printer driver installer 129 firstly receives the user selection in relation to the device model (step S501). Then the printer driver installer 129 determines whether or not the selected device model is a virtual printer driver.

When the device model selected in step S502 is not a virtual printer driver, the printer driver installer 129 executes an installation processing for a dedicated or generic printer driver (step S503). Step S503 is equivalent to the processing steps in and after step S402 in FIG. 5. Then installation is finished (step S516).

When the device model selected in step S502 is a virtual printer driver, the printer driver installer 129 installs a virtual printer driver (step S504). Since the virtual printer driver itself does not execute output of print data in relation to the port, the printer driver installer 129 prepares a dummy port without correspondence with a user input (step S505). Furthermore, since there is no requirement to prepare a plurality of print queues in relation to the virtual printer driver, the printer driver installer 129 prepares a print queue using the same name as the device model name without correspondence with a user input (step S506).

The printer driver installer 129 enumerates all generic printer drivers contained in the installation set (step S507 to step S510). The generic printer in the printer list 201 in FIG. 3 includes a "Generic Device Model 1" and a "Generic Device Model 2". Therefore, in the first loop process, the "Generic Device Model 1" is fetched, and in the second loop process, the "Generic Device Model 2" is fetched.

The printer driver installer 129 determines whether or not the fetched generic printer driver has been installed in the host computer 101 (step S508). In step S508, firstly, when the fetched generic printer driver has not been installed in the host computer 101, the printer driver installer 129 installs the fetched generic printer driver (step 6509). Since a printer queue using the generic printer driver has not been prepared, the user does not recognize that the generic printer driver is installed. Therefore the process proceeds to step S510. When the loop processing is finished, the installation processing is finished (step S516).

In step S508, when the fetched generic printer driver has been installed, the printer driver installer 129 fetches the version of the installed printer driver (step S511). Then the version number is used to determine whether or not continuing use is possible (step S512). When it is determined that continuing use is possible, the process proceeds to step S510. When the loop processing is finished, the installation processing is finished (step S516).

In step S512, when it is determined that continuing use of the installed generic printer driver is not possible, the printer driver installer 129 uninstalls the installed generic printer driver (step S513). Then the fetched generic printer driver is installed (step S514). The printer driver installer 129 uses the generic printer driver installed in step S514 to restore the printer queue configured by the generic printer driver installed before the processing in step S513 (step S515). Then the process proceeds to step S510. When the loop processing is finished, the installation processing is finished (step S516).

When describing the installation process for the general printer driver in FIG. 5, user input was executed three times: step S401, step S403, and step S405. However, as illustrated in FIG. 6, the installation process for the printer driver in the present embodiment includes user input only in step S501. If it is assumed that the printer driver installer 129 is a program for application only in relation to a virtual printer driver, step S501 is also not required. That is to say, the installation processing method for a virtual printer driver has the effect of reducing user load and operational costs.

The description to this point has explained automatic installation of a generic printer driver when the printer driver installer 129 installs the virtual printer driver, and prepares the corresponding printer queue. Although the above description included an example in which the installation process for the generic printer driver in steps from step S507 was executed by the printer driver installer 129 in FIG. 2, such processing may also be executed in the initializing process of the virtual printer driver 126. Furthermore, the processing may be performed by a set-up module for a printer driver (not shown) generally termed a Vendor Setup that is extracted from the OS 122.

Figure 7:
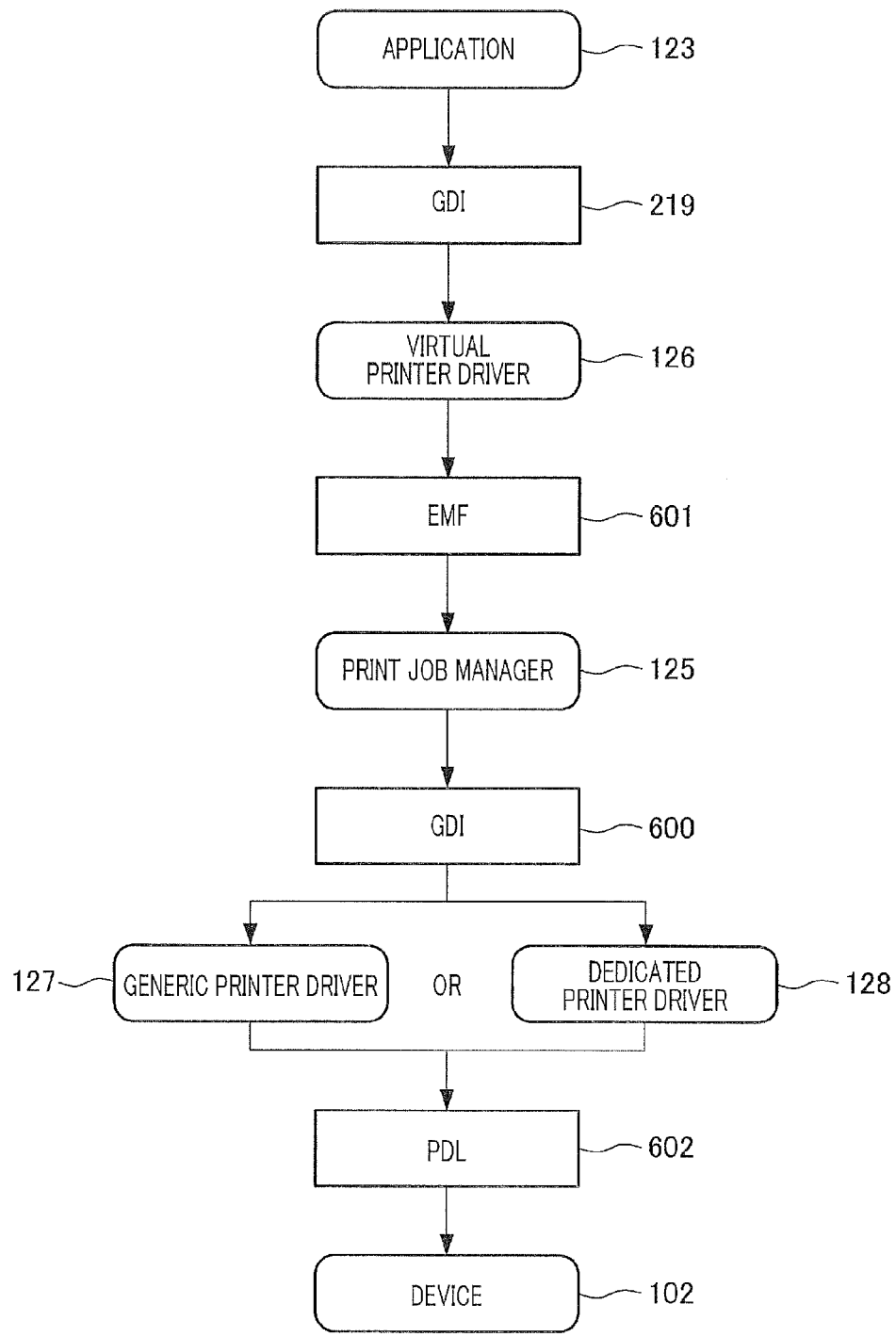
FIG. 7 illustrates data flow used in the description of print processing.

FIG. 7 illustrates data flow used in the print processing. The details of input and output operations executed with respective components of the print processing related programs will be described with reference to FIG. 7. In FIG. 7, the application 123 outputs a print instruction command through the graphic device interface (GDI) 600 that is a graphic interface provided in the OS 122 to the virtual printer driver 126. Then, the virtual printer driver 126 converts and formats the input print instruction command to an enhanced meta file (EMF) 601 for output to the printer job manager 125.

The EMF 601 is an intermediate data format that is compatible with the print instruction command of the GDI 600, and records the series of the print instruction commands output from the application 123 as reproducible data. Although EMF 601 is used as an example of an intermediate data format in the present embodiment, there is no particular limitation to EMF as long as the print instruction command is reproducible data. For example, XML paper specification (XPS), portable document format (PDF), or any other specifically defined format may be used.

Next, the printer job manager 125 executes specific processing such as specification of the output device and the management of the generic dedicated printer driver as described below. Then the print instruction command is outputted through the GDI 600. The outputted print instruction command is input to the generic printer driver 127 or the dedicated printer driver 128.

The generic printer driver 127 or the dedicated printer driver 128 converts the command to a format of a printer description language (PDL) 602 that can be processed by the output device 102, and outputs the PDL 602 to the output device 102. Finally, the output device 102 processes the input PDL 602 and executes print output.

Figure 8:
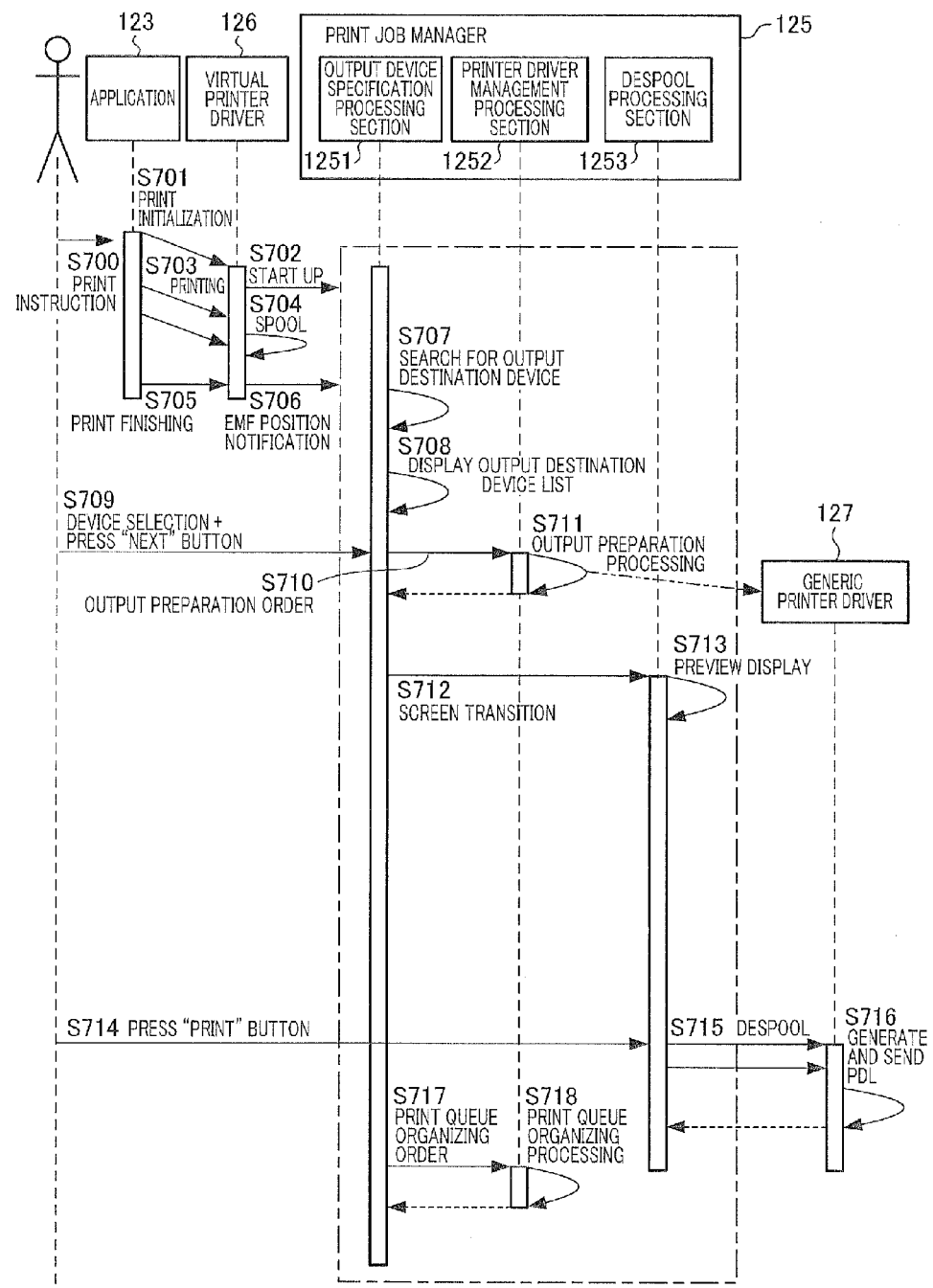
FIG. 8 illustrates a sequence used in the description of print processing.
Figure 9:
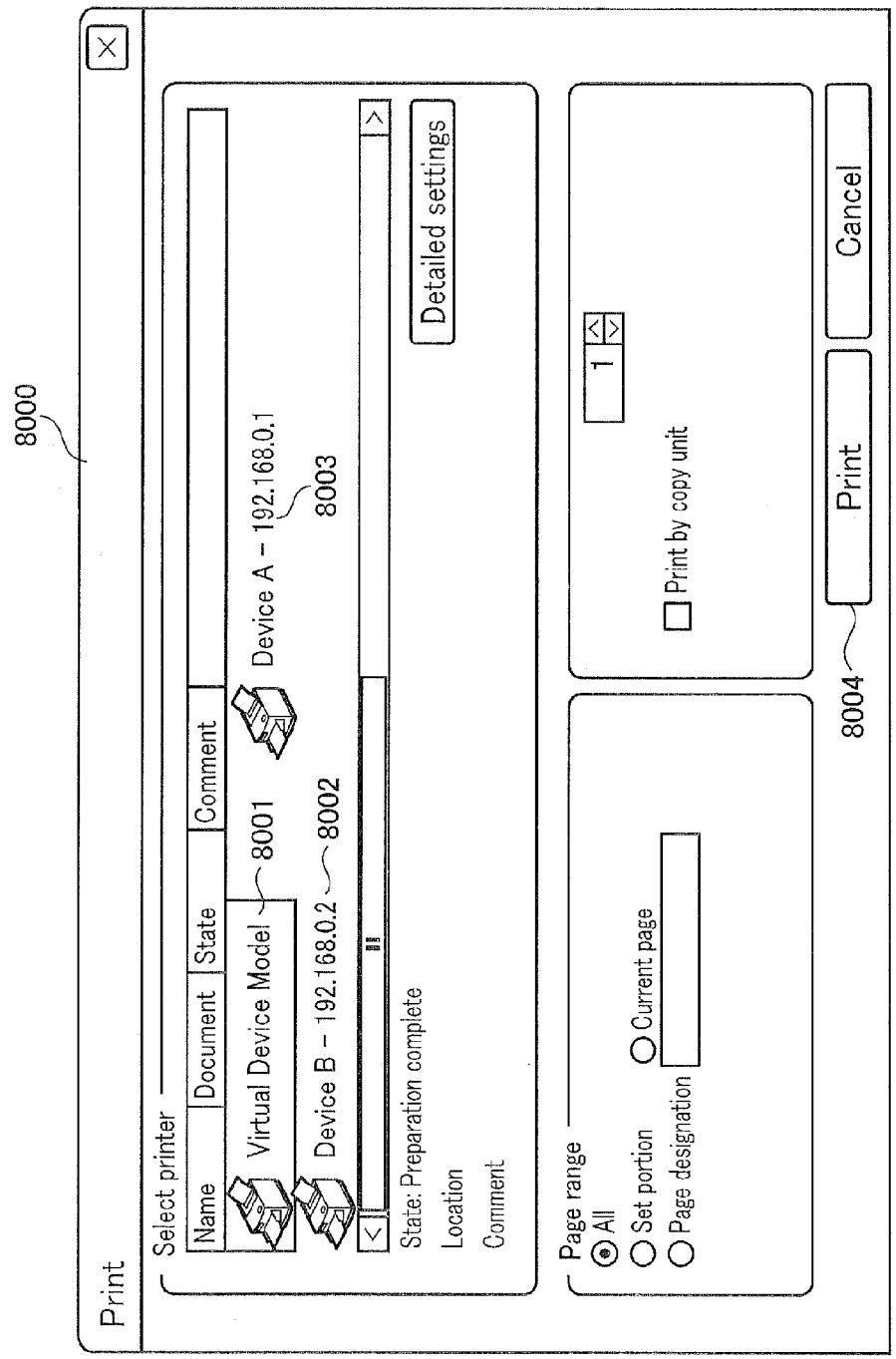
FIG. 9 illustrates a user interface for print processing.
Figure 10:
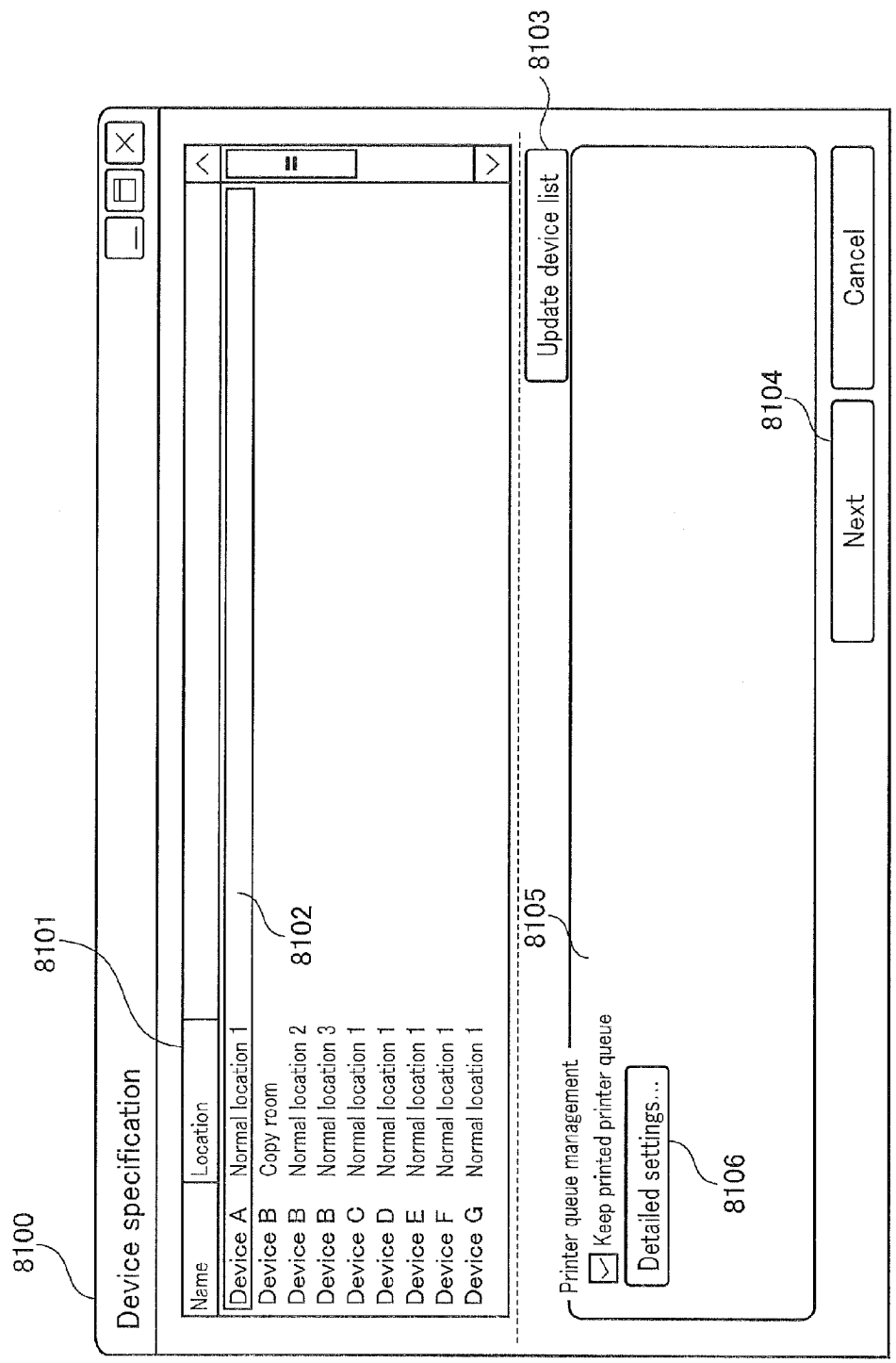
FIG. 10 illustrates the user interface for print processing.
Figure 11:
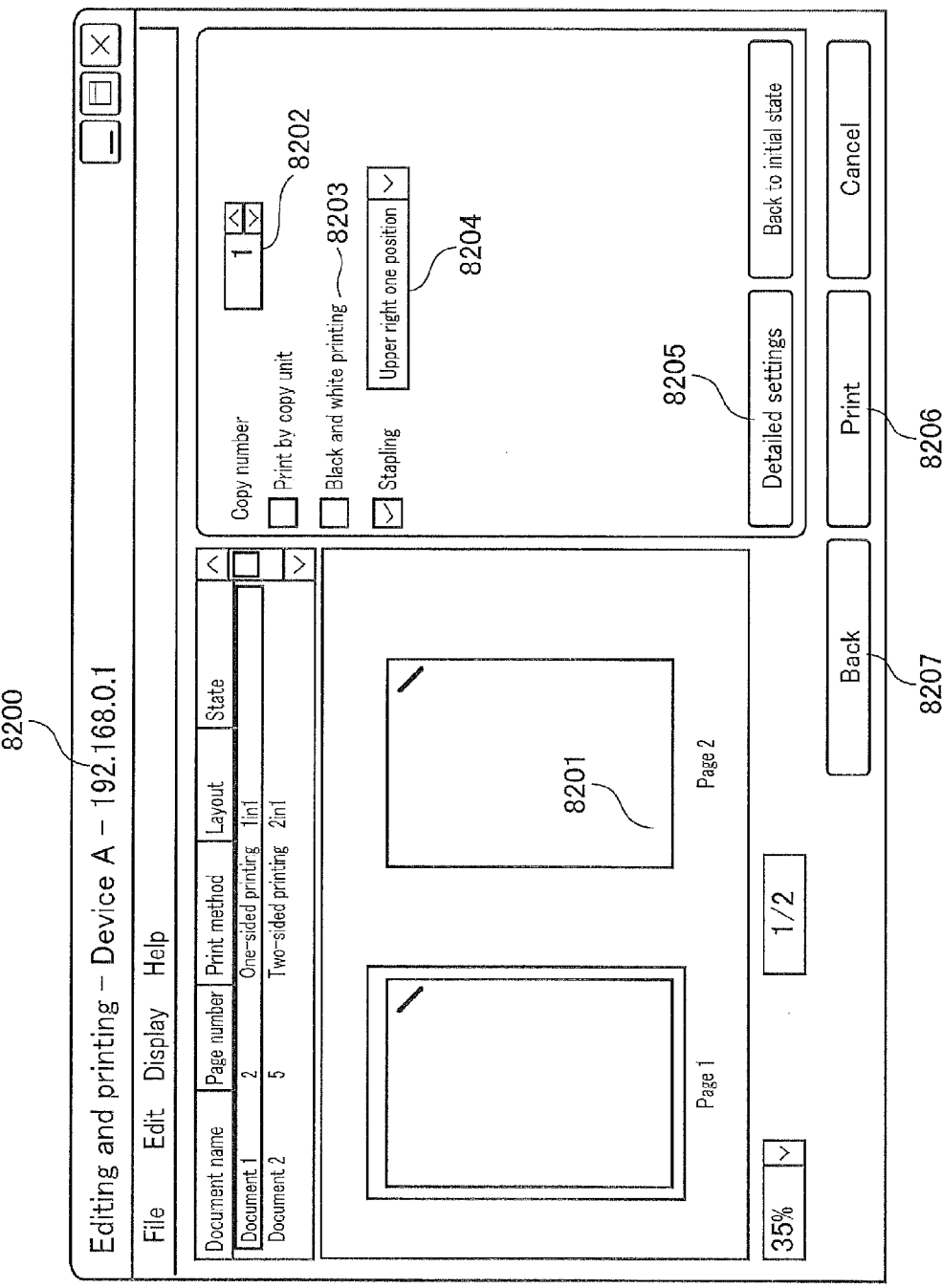
FIG. 11 illustrates the user interface for print processing.

FIG. 8 illustrates a sequence used in the print processing. FIG. 9 to FIG. 11 illustrate the user interface screens for print processing. The details of operations executed within respective components of the related programs during a series of print processing operations, and operations executed between such components, will be described with reference to FIGS. 9 to 11.

Firstly, the user inputs a print instruction for a document to be printed through the user interface 8000 illustrated in FIG. 9 to the application 123 (step S700). As illustrated in FIG. 9, the user interface 8000 includes icons 8001 to 8003 showing the print queue. The icon 8001 is the print queue for the virtual printer driver, and the icon 8002 and the icon 8003 are the print queues for the dedicated printer drivers. Since output in this example is executed through the virtual printer driver, the user selects the icon 8001, presses a print button 8004, and instructs printing (step S700).

Next, the application 123 executes print initialization processing on the virtual printer driver 126 (step S701). When the virtual printer driver 126 is initialized for printing, the startup processing for the print job manager 125 is executed (step S702).

The print job manager 125 is started up when print processing is executed on the virtual printer driver 126, and executes management processing of the printer driver and specification processing of the output device. The print job manager 125 has internal components including an output device specification processing section 1251, a printer driver management processing section 1252, and a despool processing section 1253. The output device specification processing section 1251 specifies the output device. The printer driver management processing section 1252 executes output preparation processing and print queue organizing processing when the print processing is executed in relation to the virtual printer driver 126. The output preparation processing includes processing to acquire hardware information for the output device, processing to search for a printer driver that is adapted to the hardware information, and processing to install the identified printer driver. The printer queue organizing processing includes processing to determine whether configuration information for the output device is required, processing to determine whether the configuration information has been acquired, and processing to acquire configuration information for the output device based on the determination result. The despool processing section 1253 reads out data in intermediate data format, analyzes the data and executes output of the print document. These processes are described below.

When initialization processing is executed in step S701 and the printer job manager 125 is started up, the application 123 then commences printing using the virtual printer driver 126. The application then outputs a series of print rendering commands through the GDI 600 (step S703).

The virtual printer driver 126 converts the input series of print commands and stores in an intermediate data format. In other words, the virtual printer driver 126 converts the input series of print rendering commands to an EMF 601 format, and stores the commands in the external memory 121 to enable subsequent reproduction of the print rendering commands. This operation is collectively termed "spool processing" (step S704).

The application 123 executes print finishing processing as the final command of the series of print rendering commands (step S705). The virtual printer driver 126 receives the print completion command and notifies the print job manager 125 of the storage position information of the stored EMF 601 in the external memory 121 (step S706). Although spool processing is executed on the external memory 121 in step S704, spool processing may be executed directly in relation to the print job manger 125 without reference to the external memory 121.

Next, the output device specification processing section 1251 searches for an output device (step S707). The output device specification processing section 1251 acquires device information by communicating with devices connected by the network 104. In other words, the output device specification processing section 1251 acquires information including the device name, the installation location, the IP address, and the hardware ID through the network 104. The communication method may include a known protocol such as simple network management protocol (SNMP), or the like. Normally, comprehension is not possible in advance of the state of the output device 102a, or the output device 102b, that is to say, comprehension of whether the power source is ON, or of whether there is a connection to the network 104. As a result, the output device specification processing section 1251 attempts communication with all output devices upon receipt of a print instruction. Communication with all apparatuses within the network uses a method such as a known technique of broadcasting.

When the output device specification processing section 1251 uses the broadcast method to send SNMP information acquisition data through the network I/F 118, all output devices 102 that can be reached via the network 104 receives the information acquisition data. Then, when each output device 102 sends information designated in relation to an acquisition target such as the output device name or installation location, or the like through the network I/F 138 as response data, the output device specification processing section 1251 receives those responses in sequence. The received information is stored in the RAM 112. The output device specification processing section 1251 fetches information such as the device name or the installation location from the sequentially received response information, and displays the output devices as a list on the specified dialog box 8100 (FIG. 10) (step S707).

As illustrated in FIG. 10, a list box 8101 for display of information is provided in the dialog box 8100, and an output device can be selected from the list by use of a cursor 8102. When the button 8103 is pressed, a searching operation in the network is reperformed, and the list of useable output devices is updated to a latest version. When the button 8104 is pressed, the device that is currently selected by the cursor 8102 is designated as the output destination.

In FIG. 8, the output device specification processing section 1251 receives the designation (step S709), and proceeds to the next processing step. The check box 8105 and the button 8106 are operated by the user when managing the print queue. Those operations will be described below.

When the device for output destination is determined in step S709, the output device specification processing section 1251 delegates execution of output preparation processing (step S711) to the printer driver management processing section 1252 (step S710). As a result of the output preparation processing (step S711), a print queue is stored for the generic printer driver 127 or the dedicated printer driver 128 (not shown) that enables printing by use of the output device 102 selected in the OS 122. The output preparation processing (step S711) will be described below with reference to FIG. 13 and FIG. 14. Then, the output device specification processing section 1251 transits from the specification dialog box 8100 illustrated in FIG. 10 to the dialog box 8200 as illustrated in FIG. 11 (step S712). The despool processing section 1253 functions in the dialog box 8200.

In FIG. 8, the despool processing section 1253 displays an image of the configuration of the print document when actually printed in the preview area 8201 (step S713). The image displayed at this time is generated by the despool processing section 1253 reading and analyzing the EMF 601 that was spooled in step S704 to rendering to the dimensions of the preview area 8201.

In the dialog box 8200 illustrated in FIG. 11, the spin control 8202, the check box 8203 and the list box 8204 are respectively input means for changing general printing setting such as the print copy number, black and white printing, stapling processing, and the like. When a specific print setting is changed, an individual user interface for a printer driver (not shown) is displayed by pressing the button 8205 to thereby enable input of change instructions for the print setting. At this time, when the print queue that corresponds to the output destination for a dedicated printer driver 218, the speed of changing print settings is higher than when using a generic printer driver 217. The button 8207 is an input means for returning from the current screen for the dialog box 8200 to the output device specific dialog box 8100 that is the immediately previous screen. The button 8206 is an input means for executing printing.

In FIG. 8, when the user presses the button 8206 (step S714), the despool processing section 1253 executes a despool processing with respect to the generic printer driver 217, and issues a series of print rendering commands (step S715). The despool processing is the reverse operation to a spool processing, and EMF 601 data is read from the storage location information notified in step S706, the data is analyzed, and the print rendering commands are reproduced. In this manner, print processing that had been suspended for individual processing of the printer job manager 125 can be recommenced, and output of the print document can be executed.

The generic printer driver 127 converts the input print rendering command to PDL 602, and sends the result through the network interface 138 to the output device 102 (step S716). When the print processing is ended, the output device specification processing section 1251 delegates the execution of print queue organizing processing (step S718) to the printer driver management processing section 1252 (step S717). The print queue organizing processing (step S718) will be described in detail below with reference to FIG. 17 and FIG. 18. Finally, the print job manager 125 finishes the program.

Figure 12:
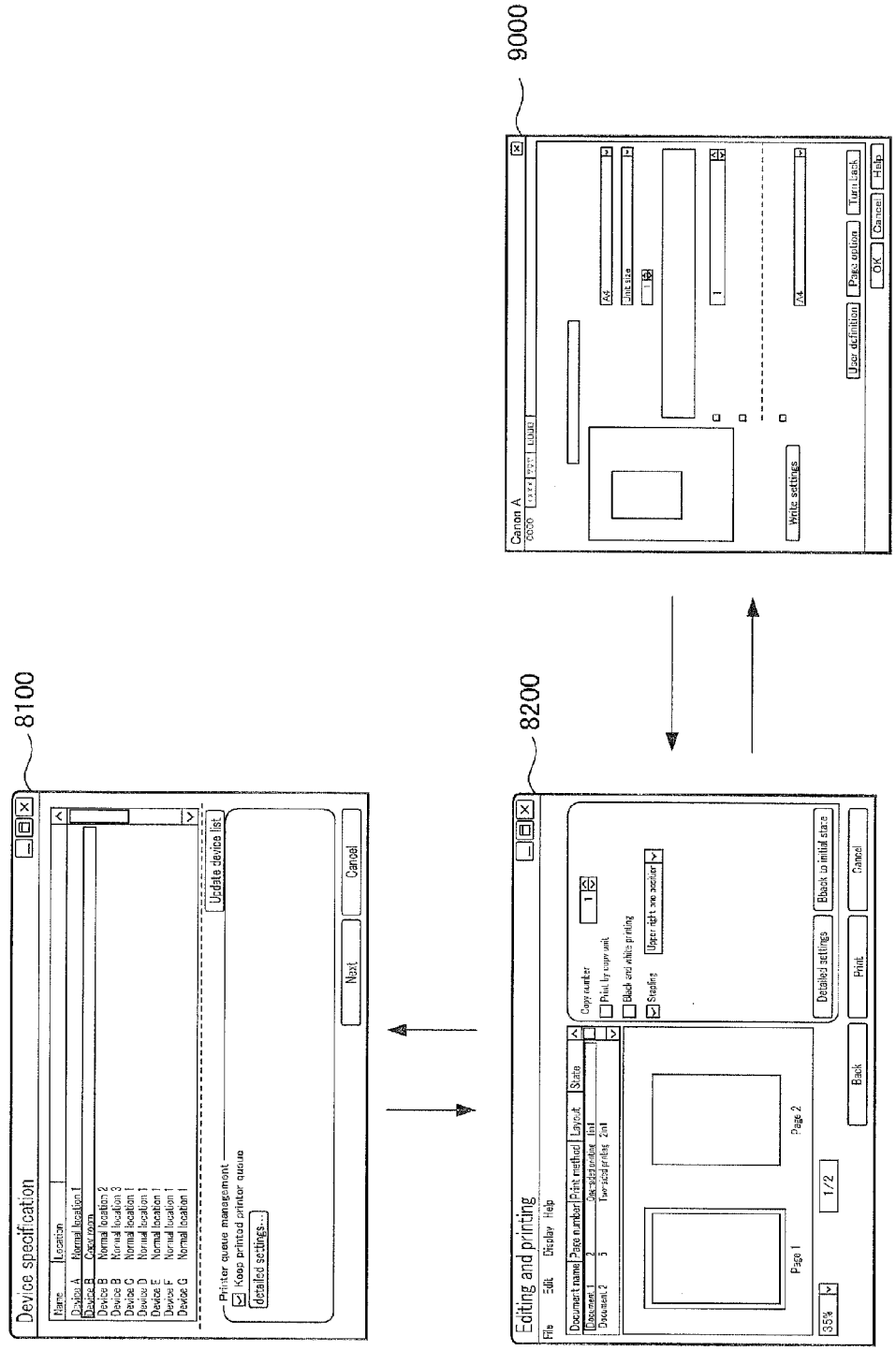
FIG. 12 illustrates a transition of the user interface.

FIG. 12 illustrates a transition of the user interface of the print job manager 125. Firstly, the print job manager 125 displays the "specify output device" dialog box 8100 illustrated in FIG. 10. When the output device is specified and the "next" button 8104 is pressed, the print job manager 125 displays an "edit preview" dialog box 8200 illustrated in FIG. 11. The "edit preview" dialog box 8200 enables confirmation of the preview of the print job and setting of basic print settings.

When the "print" button 8206 as illustrated in FIG. 11 is pressed, the print job manager 125 executes printing in relation to the output device and closes the corresponding dialog box. In addition, the "edit preview" dialog box 8200 includes a "detailed settings" button 8205 for setting specific functions that are available in the printer driver. When the "detailed settings" button 8205 is pressed, the printer job manager 125 as illustrated in FIG. 12 displays a "print settings" dialog box 9000 for the printer driver.

Furthermore, the "edit preview" dialog box 8200 in FIG. 11 includes a "back" button 8207. The "back" button 8207 enables resetting of the output device when it is realized that the output device that is currently designated as the output destination cannot realize a required function. The "back" button 8207 is pressed, the print job manager 125 displays the "specify output device" dialog box 8100 illustrated in FIG. 10, to thereby enable re-designation of the output device.

Figure 13:
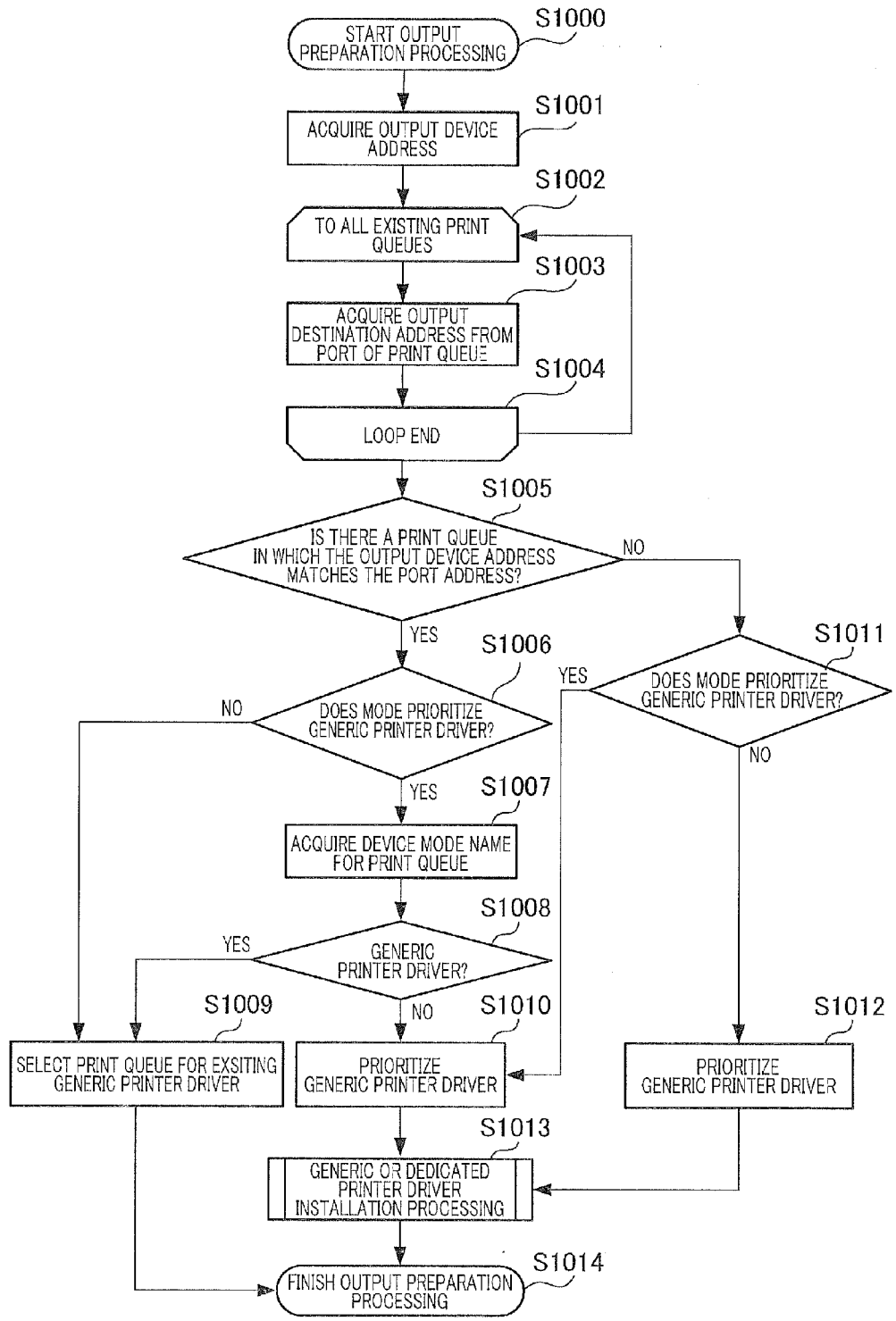
FIG. 13 is a flowchart used in the description of an output preparation processing.

FIG. 13 is a flowchart illustrating the detailed flow of an output preparation processing in the printer driver management processing section 1252 (step S711 in FIG. 8). In this processing, the printer driver management processing section 1252 sets an available print queue for printing on the output device 102. When a print queue is not available, a new print queue is prepared, or an optimal print queue is installed.

In FIG. 13, the printer driver management processing section 1252 starts output preparation processing (step S1000), and acquires the FP address information for the output device 102 (step S1001). The IP address information is acquired in the output device search process (step S707), and is used to fetch details stored in the RAM 112.

Next, the printer driver management processing section 1252 acquires the IP address of the port that is allocated to the print queue from all the print queues that are stored in the OS 122 (steps S1002 to S1004). Then, the printer driver management processing section 1252 determines whether a print queue is available in which the IP address of the output device 102 matches the IP address of the port (step S1005).

Although further details are described below, this system prepares a print queue in relation to each output device. However, when a separate print queue is prepared on each occasion when printing is executed on the same output device, duplication in relation to a large number of print queues will be recorded. In order to avoid this result, the output device is compared with the IP addresses of all print queues to determine whether output is enabled from the existing print queues.

In step S1005, when a print queue is available to enable output, the process proceeds to step S1006. When a print queue is not available to enable output, the process proceeds to step S1011. Next, in step S1006, the printer driver management processing section 1252 determines whether or not the current mode prioritizes the generic printer driver. The determination of whether or not the current mode prioritizes the generic printer driver is executed for the following reason. In other words, there is also a possibility that a dedicated printer driver 218 is included in the print queue that enables output to a desired output device 102. However, when high-speed functioning is not required, a user may elect to use a simple and stable generic printer driver 217. For this reason, the provision of a switchable mode has been proposed to prioritize a generic printer driver by use of a user interface (not shown).

In step S1006, when the mode is true, that is to say, priority is given to the generic printer driver, the process proceeds to step S1007. When this is not the case, the process proceeds to step S1009. Then in step S1007, the printer driver management processing section 1252 acquires the device model name of the printer queue. The printer driver management processing section 1252 determines whether or not the device model name is for the generic printer driver (step S1008). In contrast to the print queue name that can be changed by the user, the device model name of the generic printer driver is a specific name such as "Generic Device Model 1". Therefore the generic printer driver determines the type of driver when the device model name in the print queue is known.

In step S1008, when a generic printer driver is handled, the printer driver management processing section 1252 determines that the printer queue for the generic printer driver will be the output destination (step S1009). Then the output preparation processing is finished (step S1014).

When a generic printer driver is not handled in step S1008, the printer driver management processing section 1252 determines that the generic printer driver will be prioritized (step S1010). Then the generic printer driver is prioritized and installed in a dedicated or generic printer driver install process (step S1013).

In step S1011, it is determined whether or not the mode prioritizes the generic printer driver in the same manner as step S1006. When the determination is true, the process proceeds to step S1010, and when the determination is false, the process proceeds to step S1012.

In step S1012, since a component that enables output to the existing print queue is not available, and the mode does not prioritize the generic printer driver, searching for the most suitable complying driver, and installation are executed, and the process proceeds to step S1013. The printer driver installation process (step S1013) will be described in detail with reference to FIG. 14.

Figure 14:
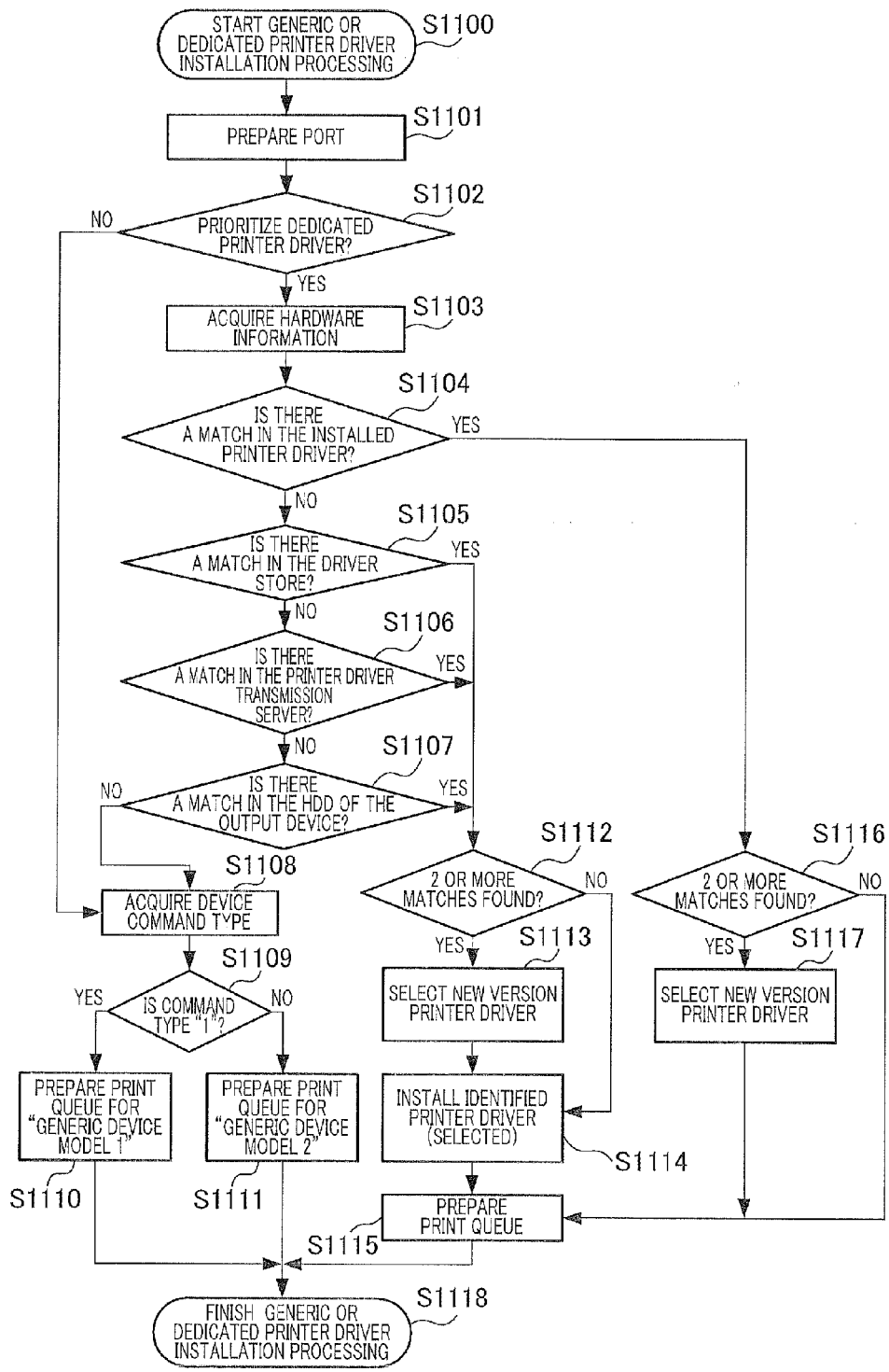
FIG. 14 is a flowchart of a generic or dedicated printer driver installation process.

FIG. 14 is a flowchart describing the detailed flow of the generic or dedicated printer driver installation process by the printer driver management processing section 1252 (step S1013 in FIG. 13).

Firstly, the printer driver management processing section 1252 commences processing (step S1100), and prepares an output port (step S1101). Then, the printer driver management processing section 1252 determines whether or not the mode prioritizes the dedicated printer driver (step S1102). When true, the process proceeds to step S1103, and when false, the process proceeds to step S1108.

The step S1103 to step S1107 are steps in which searching is executed for an optimal dedicated printer driver 143 for output from the host computer 101, the printer driver transmission server 103, or the output device 102a or 102b.

Firstly, in step S1103, the printer driver management processing section 1252 acquires the hardware information for the output device. In the present embodiment, hardware information such as the hardware ID used in plug-and-play installation is acquired. The hardware ID is acquired in the search process for the output device (step S707 in FIG. 8), and fetches items stored in the RAM 112.

Next, in step S1104, the printer driver management processing section 1252 determines whether or not there is a matching printer driver in the installed printer driver. More specifically, the printer driver management processing section 1252 compares the hardware information for each printer driver stored in the OS 122 and the hardware information for the output device 102 acquired in step S1103. When both sets of information are matching, all information is picked up. When one or more is matching, the process proceeds to step S1116, and when this is not the case, the process proceed to step S1105.

Next, in step S1105, the printer driver management processing section 1252 determines whether or not there is a matching printer driver in a driver store. A driver store is a database system for device drivers introduced by Windows Vista (Registered Trademark), and describes a package of device drivers before installation stored in the OS 122. The printer driver management processing section 1252 can inquire to the OS 122 in relation to whether there is a driver that matches the hardware information for the output device acquired in step S1103 among the printer drivers that are stored in the driver store. When the result of the inquiry is that there is at least one matching driver, the process proceeds to step S1112, and when this is not the case, the process proceeds to step S1106. Next, in step S1106, it is determined whether or not there is a matching printer driver in the printer driver transmission server (103).

The printer driver management processing section 1252 can inquire through the network 104 with the printer driver transmission server 103 in relation to whether there is a matching printer driver in a certain set of hardware information. More specifically, inquiries are executed using a means such as remote procedure call (RPC), hyper text transfer protocol (HTTP), or the like. When the result of the inquiry is that there is at least one matching component, the package for the printer driver is sent from the printer drive transmission server 103 to the host computer 101. The package of the printer driver is stored in the external memory 121, and the process proceeds to step S1112. When this is not the case, the process proceeds to step S1107.

Next, in step S1107, the printer driver management processing section 1252 searches in the output device 102 to determine whether or not there is a matching driver. As described above, the output device 102 can store the dedicated printer driver 143 required for using the output device itself in the external memory 134. The printer driver management processing section 1252 can inquire in relation to the printer driver stored in the output device 102 through the network 104 using the same method as step S1106.

When the result of the inquiry is that there is at least one matching component, the printer driver management processing section 1252 transfers data for the dedicated printer driver 143 from the output device 102 to the host computer 101. The data for the dedicated printer driver 143 is stored in the external memory 121, and the process proceeds to step S1112. Since the dedicated printer driver 143 is deleted by changing the settings of the external memory 134, when the result of the inquiry indicates that there is not one matching driver, the process proceeds to step S1108.

Step S1108 to step S1111 configure a process for a substitution means when the result of the series of processes in step S1103 to step S1106 above is that no matching printer driver is identified. In this case, the printer driver management processing section 1252 prepares a print queue for the generic printer driver that was already installed in step S500 to step S516.

Firstly, the printer driver management processing section 1252 acquires command type information for the output device 102 through the network 104 (step S1108), and it is determined whether or not the information has a value of "1" (step S1109). As used herein, the command type information is information that expresses the type of PDL 602 that enables processing by the output device 102. The generic printer driver 127 is a driver that issues a PDL that can be output to the plurality of device models. However, at most, only one type of PDL is issued. Therefore, since output is not enabled in relation to a device model that supports a different PDL, command type information is acquired to thereby confirm compatibility.

Since this embodiment is premised on use of an output device that complies with 2 types of PDL, either "1" or "2", it is determined whether or not the command type of "1". When the command type is type "1", the process proceeds to step S1110, and in other case, that is to say, when the command type is type "2", the process proceeds to step S1111.

In step S1110, the printer driver management processing section 1252 prepares a printer queue for the "Generic Device Model 1" that complies with the command type "1", and the process is finished (step S1116). On the other hand, in step S1111, the printer driver management processing section 1252 prepares a printer queue for the "Generic Device Model 2" that complies with the command type "2", and the process is finished (step S1116). When the printer queue is prepared, the printer driver management processing section 1252 allocates the port prepared in step S1101.

In step S1112 to step S1114, the printer driver management processing section 1252 installs a matching dedicated printer driver 143 based on the search results. Firstly, in step S1112, it is determined whether or not two or more matching printer drivers have been identified. When true, the process proceeds to step S1113, and when false, the process proceeds to step S1114.

In step S1113, the printer driver management processing section 1252 selects the newest printer driver version from the matching printer drivers. A version is allocated to each printer driver, and for example, even when a printer driver for the same device model is identified, the manufacturing period is different and therefore normally the driver has a different version. The method of expression a version may for example be expressed by a combination of figures and a date such as "10/10/2008.2.5.0.0" to thereby enable simple determination of which driver is the newly prepared driver. But very infrequently, it may be necessary to use a driver that has an old version.

Figure 15:
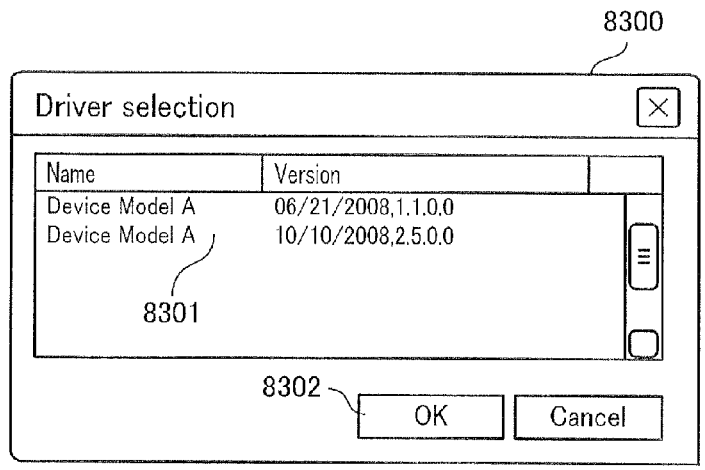
FIG. 15 describes a user interface for selection of a driver.

In that case, a dialog box 8300 as illustrated in FIG. 15 is displayed for selected by the user. Information for a plurality of matching printer drivers (name, version) is displayed in a list 8301. The user determines the printer driver by selecting a desired printer driver from the list 8301 and pressing a button 8302.

Next, in step S1114, the printer driver management processing section 1252 installs a matching printer driver, or when there are a plurality of matching drivers, installs the printer driver that is selected in step S1113. The steps S1116 and S1117 are processes related the special case in steps S1112 to S1114. In other words, the steps S1116 and S1117 are steps when there is a matching printer driver in the installed printer driver. Step S1116 is the same as step S1112, and step S1117 is the same as step S1113. Step S1114 is unnecessary since there is no longer a need to install a printer driver.

Finally, in step S1115, the printer driver management processing section 1252 prepares a print queue associated with a port prepared in step S1101, and the processing is finished (step S1116).

As described to this point, the printer driver management processing section 1252 stores the printer queue during printing in the OS 122. When the output device is identified in relation to the next and subsequent printing operations, the print queue can be designated directly without reference to the virtual printer driver 126, and printing can be executed using a simple and normal procedure without a designation step for the output-destination device. However, when there is a plurality of output devices in the office, or when printing is executed in a plurality of offices, since respective print queues are prepared, there is a tendency for the number of print queues to increase.

As illustrated by the transition of user interface in FIG. 12, the printer driver management processing section 1252 can repeat any number of transitions of the screen having the "specify output device" dialog box 8100 and the "edit preview" dialog box 8200. When a print queue for the output device selected in the list box 8101 (refer to FIG. 10) for "output device" is not available in the host computer 101, the printer driver management processing section 1252 prepares a new printer queue for each transition. By repeatedly pressing the "back" button 8207 (refer to FIG. 11), there is a tendency for a further increase in the number of print queues on the host computer 101. When the overall number of print queues on the host computer 101 increases, the printer queues displayed in the "print" dialog boxes 8000 increases, and therefore makes selection by the user problematic. For that reason, there is a need for a management means for print queues that are automatically generated.

Figure 16:
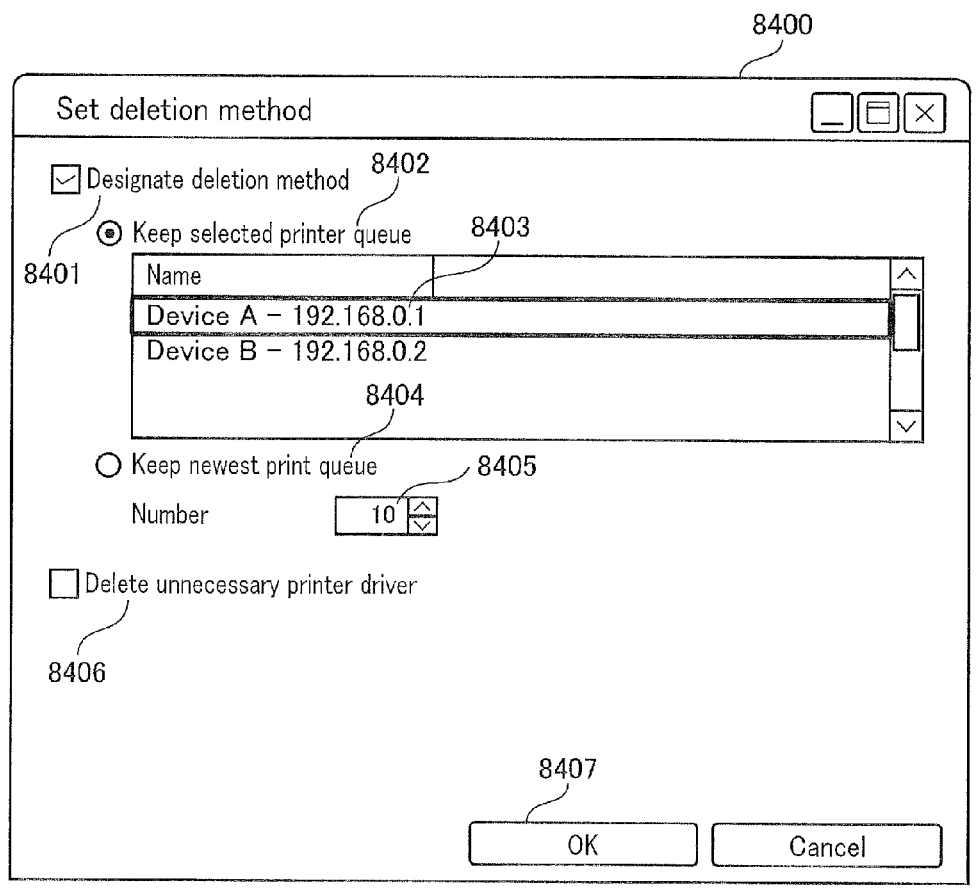
FIG. 16 describes a user interface for designation of a deletion method.

FIG. 16 describes a dialog box 8400 for "set deletion method". When the "detailed setting" button is pressed on the dialog box 8100 for "designate output device" as illustrated in FIG. 10, the dialog box 8400 is displayed on the display 120. When the "OK" button 8407 in the dialog box 8400 is pressed, the "set deletion method" dialog box 8400 is closed. Thereafter, the "designate output device" dialog box 8100 illustrated in FIG. 10 is displayed, and the processing shifts to the dialog box 8100.

The "set deletion method" dialog box 8400 includes a "designate the deletion method" checkbox 8401. The initial state of the checkbox 8401 is unchecked. When the checkbox 8401 is checked, the items between the radio button 8402 and the spin box 8405 are valid, and detailed settings for the deletion method of the print queue are enabled.

A "keep selected print queue" radio button 8402 and a "keep newest print queue" radio button 8404 are provided in the "set deletion method" dialog box 8400 to enable designation of detailed settings for the deletion method of the print queue. The designation made in relation to the two radio buttons is exclusive, and when the "keep selected print queue" radio button 8402 is selected, the "keep newest print queue" radio button 8404 is placed into a non-selectable state. Conversely, and when the "keep newest print queue" radio button 8404 is selected, the "keep selected print queue" radio button 8402 is placed into a non-selectable state. The "keep selected print queue" radio button 8402 is selected in the default state.

When the "keep selected print queue" radio button 8402 is in a selected state, the selection of the list box 8403 is valid. The print job management 125 lists up elements prepared by the printer driver management processing section 1252 in a print queue on the host computer 101, and displays the list on the list box 8403. However, since this list is special, and is not prepared by the printer driver management processing section 1252, the "virtual device model" that is the print queue of the virtual printer driver 126 is not contained in the list.

If the "OK" button 8406 is pressed when the "keep selected print queue" radio button 8402 is selected, the print job management 125 treats items not selected in the list box 8403 as objects for deletion. When the "keep newest print queue" radio button 8404 is selected, a number can be designated in the spin box 8405 for validation.

If the "OK" button 8406 is pressed when the "keep newest print queue" radio button 8404 is selected, the print job management 125 recognizes that the setting of the number in the spin box 8405 is valid. The print queues designated for deletion in this setting are limited to the queue prepared by the printer driver management processing section 1252 on the host computer 101, in the same manner as the selection using the "keep selected print queue" radio button 8402. Similarly, the "virtual device model" that is the print queue for the virtual print driver 126 is not included.

In addition, the "set deletion method" dialog box 8400 includes a "delete unnecessary printer drivers" checkbox 8406. In the default state, the checkbox 8406 is not checked. When the checkbox 8401 is checked and the "OK" button 8406 is pressed, the print job manager 125 determines that a deletion request has been received for queues that are not allocated with the printer queue. The print job manager 125 uses the information set in the "set deletion method" dialog box 8400 to delegate a print queue organizing processing to the printer driver management processing section 1252.

Figure 17:
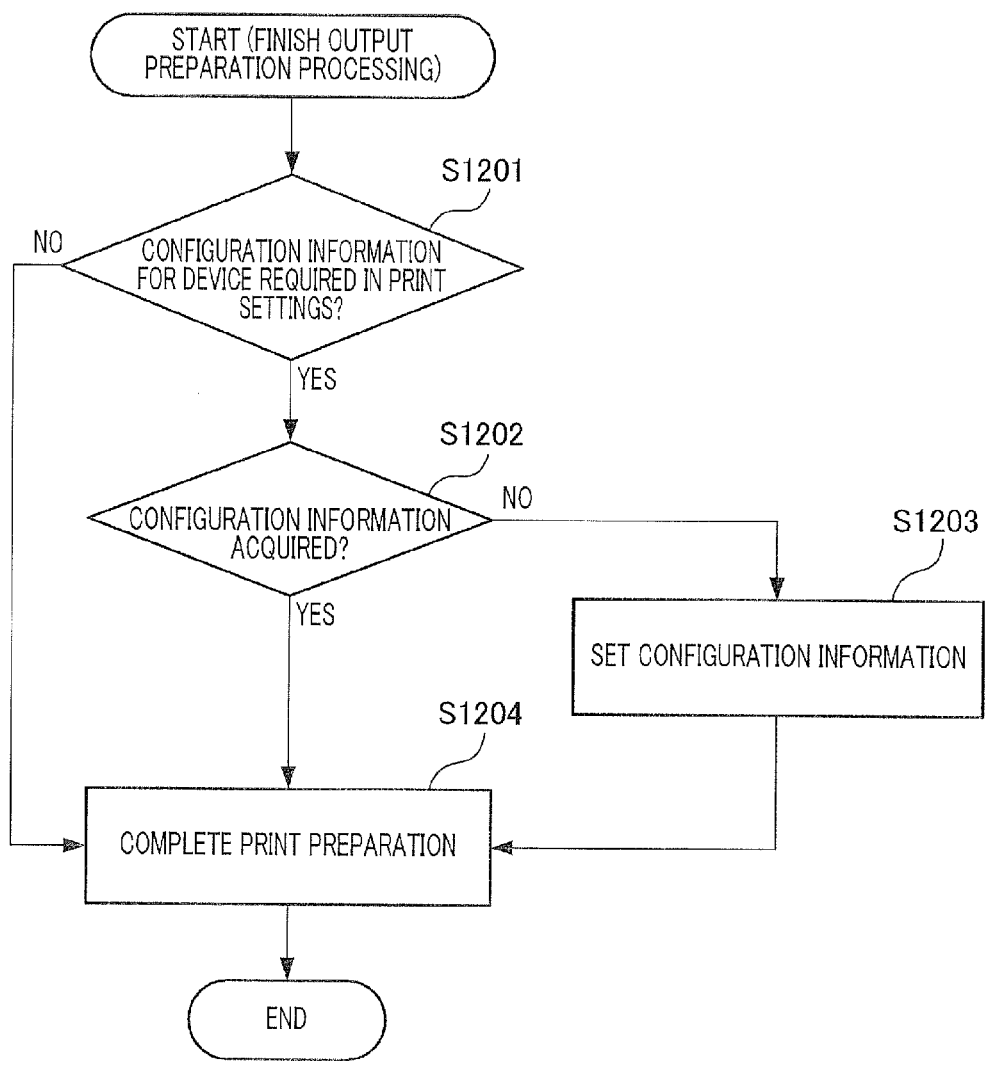
FIG. 17 is a flowchart of a process for acquiring configuration information for an output device.

FIG. 17 to FIG. 23 describe the printer queue organizing processing (step S718 in FIG. 8). FIG. 17 is a flowchart of a process for acquiring configuration information for an output device. After the printer driver management processing section 1252 finishes the generic or dedicated printer driver installation process (step S1118) (refer to FIG. 14), the print settings are set in step S1201. The print settings in step S1201 determine whether or not the configuration information for the output device is required. The details of the determination process for whether or not configuration information for the output device is required will be described with reference to FIG. 18.

When the result of the determination in step S1201 shows that configuration information for the output device is not required, the printer driver management processing section 1252 proceeds to the process to step S1204, completes printing preparation, and executes printing. When it is determined that configuration information for the output device is required, the printer driver management processing section 1252 progresses the process to step S1202, and determines whether or not configuration information for the output device has already been acquired. The details of the determination process for whether or not configuration information has already been acquired will be described with reference to FIG. 20.

In step S1202, when the configuration information has already been acquired, the printer driver management processing section 1252 progresses the processing to step S1204, completes print preparation, and executes printing. When the configuration information has not yet been acquired, the printer driver management processing section 1252 progresses the processing to step S1203, sets the configuration information, proceeds to step S1204, completes print preparation, and executes printing. The details of the determination process for setting configuration information will be described with reference to FIG. 21.

Figure 18:
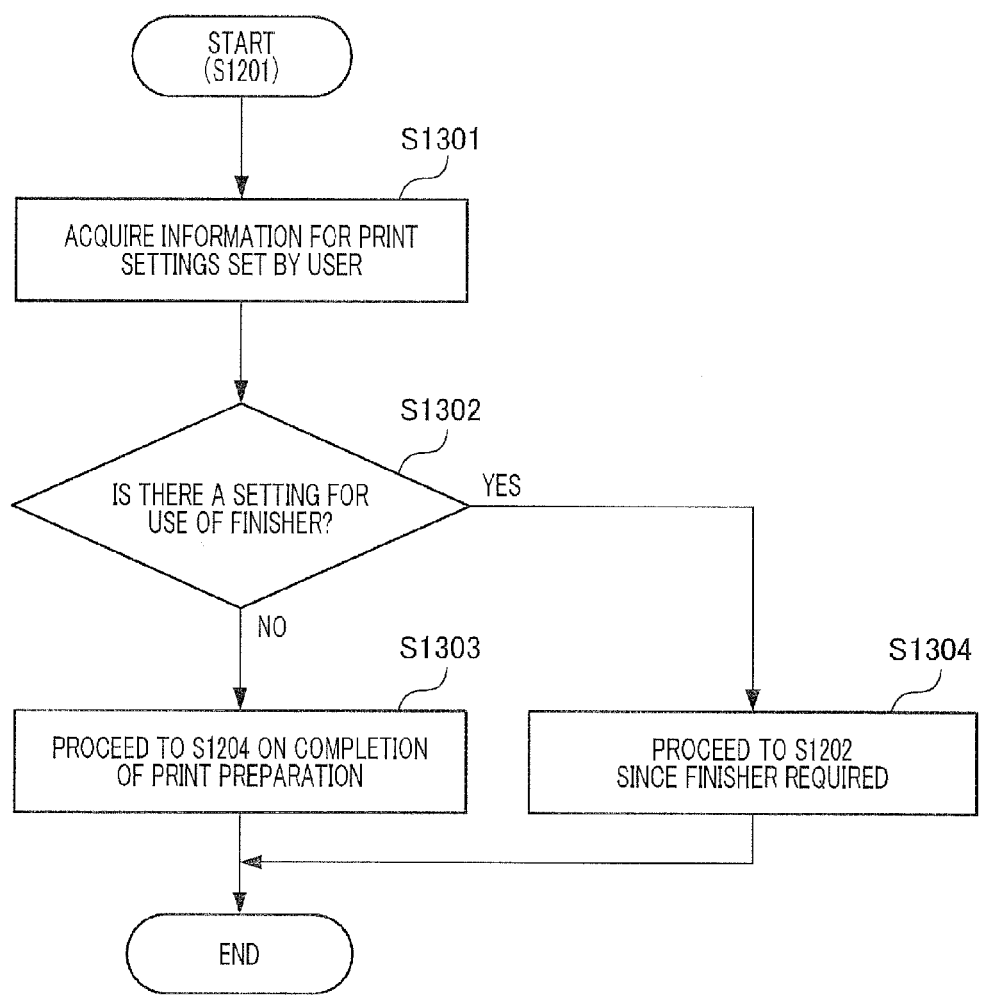
FIG. 18 is a flowchart of a print setting determination processing.

FIG. 18 is a flowchart illustrating an example of a process of determining whether or not configuration information for the output device is required by the system (step S1201 in FIG. 17). The printer driver management processing section 1252 acquires the printing settings set in step S1301. The print settings for determining whether or not configuration information for the output device is required are settings designated by a user through an application to the virtual printer driver. The print settings are retained as a DEVMODE structure designated in Windows (Registered Trademark) by the virtual printer driver in the system. These print settings are equivalent to the setting items displayed in the "edit preview" dialog box 8200 after the dialog box 8100 of the printer driver (refer to FIG. 11).

In step S1301, when the information print settings are acquired, the printer driver management processing section 1252 progresses the process to step S1302. In step S1302, the printer driver management processing section 1252 determines whether or not the print settings contain a setting to set a punching process for product from the output device, a process for a cover or the like, or a setting for using a finisher that executes such processes. An example of the settings for a finisher is the stapling setting illustrated in the list box 8204 (refer to FIG. 11) that instruct settings for a punching process (not shown) or the like. In the system, when analysis of the DEVMODE that is transferred from the virtual printer driver indicates that there is one finisher setting, the process proceeds to step S1202, and when there is no finisher setting, the print preparation is completed, and processing is finished.

The process in step S1302 may be executed by a determination based on the setting details by reading the XML (markup language) description retained as print settings. In other words, the determination is executed by the return value that sends an inquiry to the printer driver 126 in relation to the object that causes the printer to function. More specifically, the process of preparation of a XML-format print ticket is executed. In other words, an XML print ticket that is prepared by a printing schema from the DEVMODE acquired in step S1301 is created. The application generates an inquiry related to print capabilities prepared for acquiring the output device function. "Print capabilities" is an object for executing the functions of the print processing in relation to a document.

When the inquiry is generated in relation to the print capabilities, if the return value is acquired and the "device settings" value returns a constrained value, it is determined that there is an unconformity in the settings for the output device. Consequently, it is determined that a non-matching setting for the output device is contained in the print settings, that is to say, it is determined that although configuration of the finisher is required, configuration information is not set. The printer driver management processing section 1252 uses this determination result and progresses the process to step S1304 in order to set configuration information for the output device.

FIG. 19 describes an example of "constrained" that is returned by the inquiry in relation to the print capabilities in step S1302. "Print capabilities" is set in the constrained information 16000, and the information is retained. For example, information 16002 is set to return the device settings in the section of the punch settings 16001.

Figure 20:
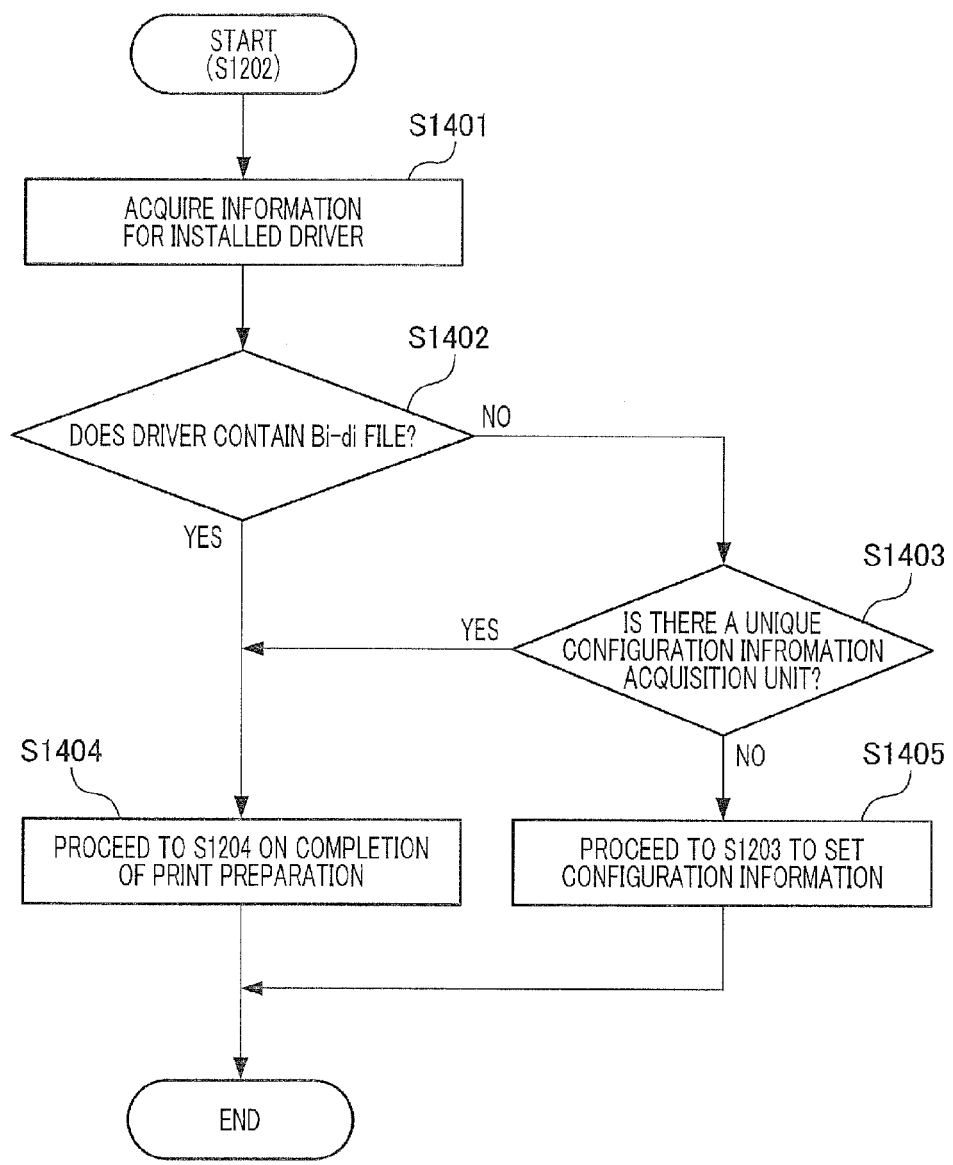
FIG. 20 is a flowchart of the determination processing for configuration information acquisition.

FIG. 20 is a flowchart of an example of the processing by which the system determines whether or not configuration information for the output device has been set in the printer driver (step S1202 in FIG. 17). In the present example, the printer driver management processing section 1252 determines whether a Bi-Di file (bidirectional file) is included in the configuration files for the printer driver. The determination of whether or not configuration information for the output device has been set is determined by whether or not there is an autoconfig (automatic device configuration settings) function in the OS.

That is to say, the printer driver management processing section 1252 acquires information such as the model name or file configuration for the printer driver that was installed in step S1401. Then in step S1402, the printer driver management processing section 1252 determines whether a Bi-Di file is included in the printer driver. A Bi-Di file is a file in which information is described in relation to exchange operations by the printer driver with the output device. When a Bi-Di file is included, it can be determined that an autoconfig function is present as a standard OS function. Consequently, the printer driver management processing section 1252 determines that configuration information for the output device has been acquired, and progresses the process to step S1404. When a Bi-Di file is not included, the printer driver management processing section 1252 determines that an autoconfig function is not present as a standard OS function, determines that the configuration information for the output device has not been acquired, and progresses the process to step S1405. In step S1404, print preparation is completed, the process proceeds to step S1204.

In step S1403, when there is no autoconfig function, the printer driver management processing section 1252 determines whether or not there is a unique configuration information acquisition means in the printer driver. The determination of whether configuration elements have been acquired is executed by determining whether or not the system has already identified an interface for the configuration information acquisition means in the printer driver. Alternatively, the determination of whether the configuration elements have been acquired is executed by whether configuration information is retained by the printer driver. In other words, when the specification of the printer driver is known, it is determined whether or not writing of configuration information into the configuration file or registry has occurred after installation.

When the interface for the printer driver is known, the printer driver management processing section 1252 progresses the process to step S1404. When the interface for the printer driver is not known, the printer driver management processing section 1252 progresses the process to step S1405.

Then the process proceeds to the setting process for configuration information in step S1203.

Figure 21:
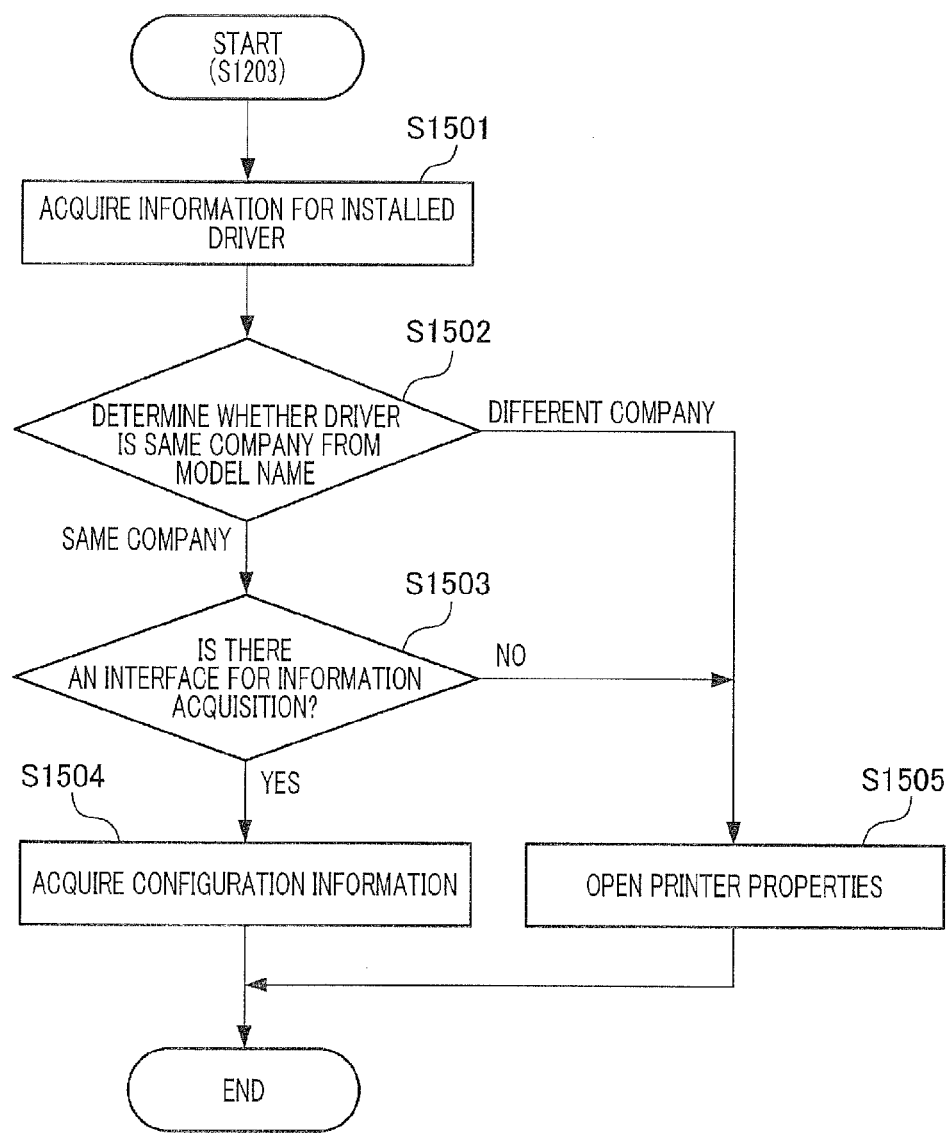
FIG. 21 is a flowchart of the configuration information acquisition processing.

FIG. 21 is a flowchart illustrating an example of a process for setting of the configuration information for the output device by the system (step S1203 in FIG. 17). The process of acquiring configuration information for the output device is such that an external interface for acquiring configuration information for the output device is provided in the installed printer driver, and when the information is known, the configuration information for the output device is acquired through the external interface.

In other words, the printer driver management processing section 1252 acquires information such as the model name of the target output device or the like from the installed printer driver in step S1501. Then it is determined in step S1502 whether or not there is specific information in relation to the same company's printer driver in the model name. When specific information is present that enables specification of the same company in the model name contained in the printer driver, the printer driver management processing section 1252 progresses the process to step S1505, and when specific information is not included, the process proceeds to step S1503.

In step S1503, the printer driver management processing section 1252 determines whether the installed printer driver has the function of acquiring information for the output device, and whether an interface is retained that can be used from outside the printer driver. When the system determines that the printer driver can acquire configuration information for the output device from the interface that has been identified by the system, the printer driver management processing section 1252 progresses the process to step S1504. The configuration information for the target output device is acquired, and reflected into the printer driver. When it is determined that the printer driver cannot acquire configuration information for the output device, the printer driver management processing section 1252 progresses the process to step S1505.

When the installed printer driver is identified as belonging to another company in step S1505, or when it is deemed that acquisition of the interface for acquisition of configuration information of the output device from the printer driver was not possible, the printer driver management processing section 1252 opens the properties of the installed printer driver (the printer properties 17000 in FIG. 22) and provides the user with an input screen for the configuration information. In this manner, the configuration information for the output device is acquired.

Figure 22:
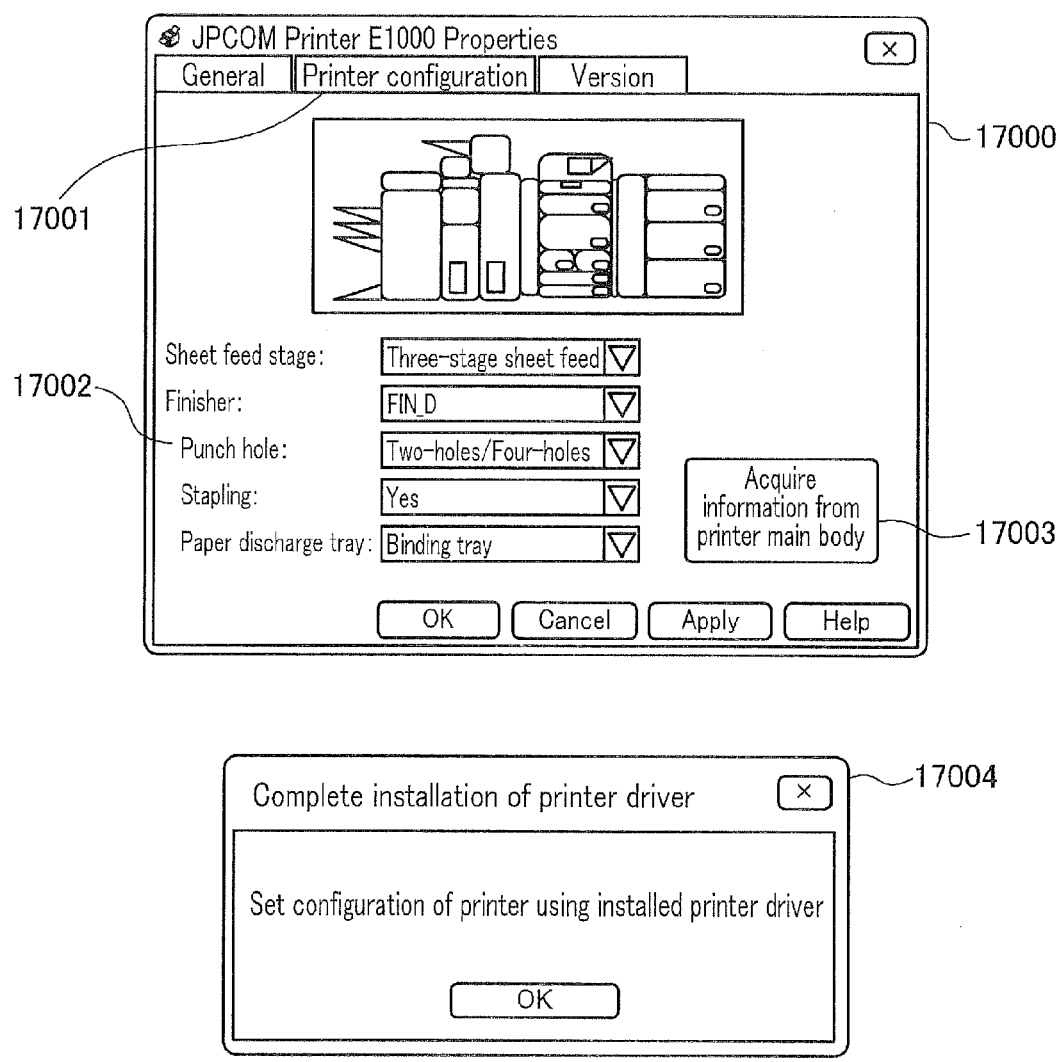
FIG. 22 describes the properties of a printer driver.

FIG. 22 illustrates an example of a properties dialog box for the printer driver opened in step S1505 by the system. When an interface for acquiring configuration information for the printer driver cannot be acquired, the properties 17000 of the installed printer are displayed. The properties 17000 illustrate an example of a dialog box when opening printer properties for a model name "JPCOM Printer E1000". A screen for setting configuration information for an output device is prepared in the "printer configuration" tab 17001. The user uses the screen to set the configuration of the output device in the respective item displays 17002 in the finisher or the settings of the device for supplying paper. An interface (display 17003) to automatically "acquire information from printer main body" may be prepared by the printer driver. Before display of the printer properties 17000, the system may also execute a message display 17004 prompting the user to set configuration information for the output device.

Figure 23:
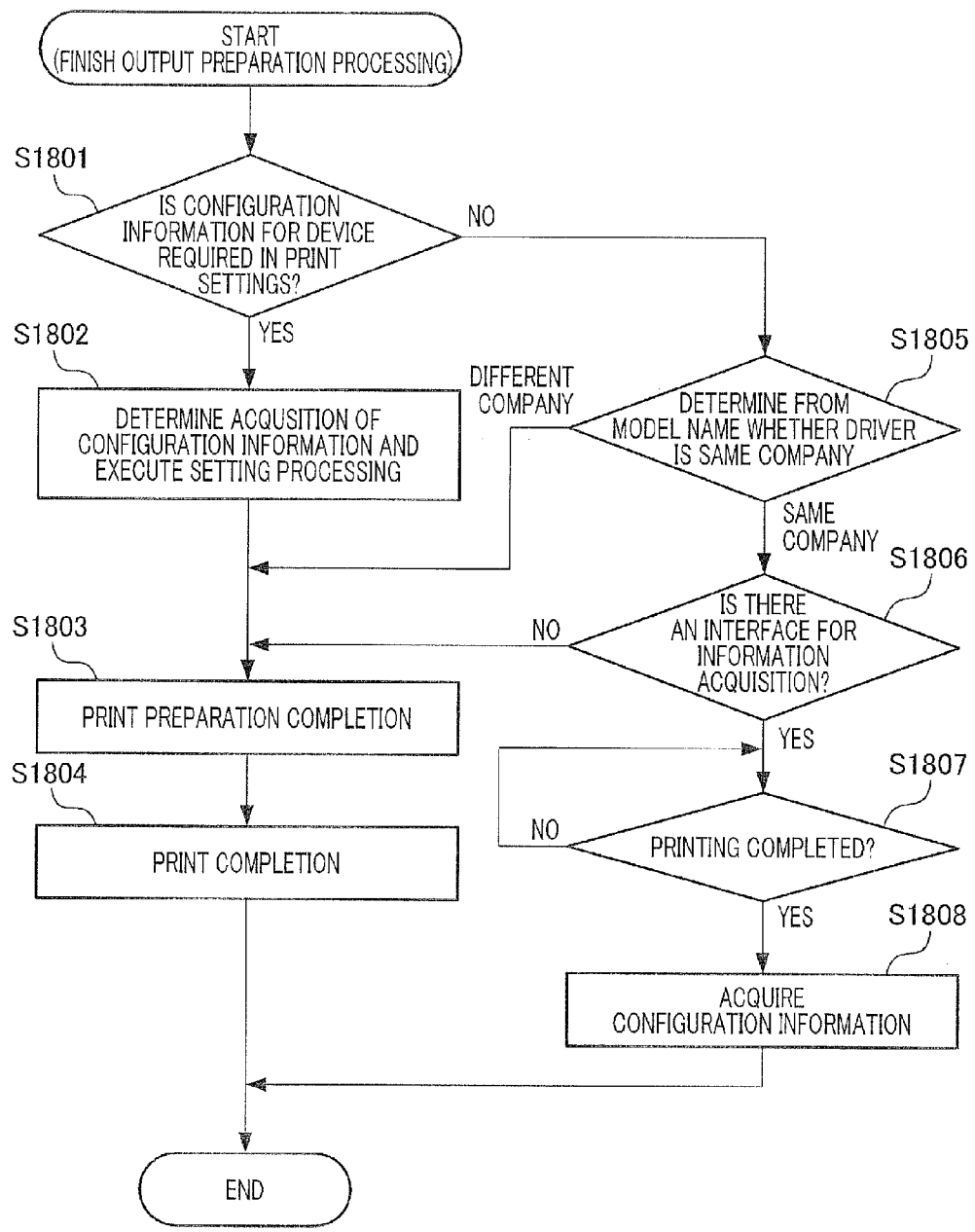
FIG. 23 is a flowchart of the configuration information acquisition processing after print processing.

FIG. 23 is a flowchart illustrating an example of the process when configuration information for the output device is deemed to be not required due to the determination in step S1201 in FIG. 17. In step S1801, the printer driver management processing section 1252 determines whether or not configuration information for the output device is required in the print setting such as step S1201, and when configuration information is determined to be required, the process proceeds to step s1802. A similar process to the step S1202 and step S1203 is executed, the process proceeds to the printer preparation completion step in step S1803, and after print completion (step S1804), the system is finished.

When it is determined that configuration information for the output device is not required in the print settings in step S1801, the printer driver management processing section 1252 progresses the process to step S1805. The model name for the installed printer driver is acquired in the same manner as step S1502, and the model name is used to determine whether or not the driver is from the same company. When it is determined from the model name that the driver is not from the same company, the printer driver management processing section 1252 progresses the process to the print preparation completion step in step S1803. When it is determined that the printer driver is from the same company, the process proceeds to step S1806. In step S1806, the printer driver management processing section 1252 determines whether or not the interface for configuration information of the output device can be acquired from the installed printer driver in the same manner as step S1503. When the interface cannot be acquired, the process proceeds to the print preparation completion step in step S1803. When the interface was acquired, print completion from the system is completed in step S1807. Thereafter, when the sending of the print job to the output device is completed, the printer driver management processing section 1252 deems the printing to be completed, and executes an acquisition processing for configuration information for the output device in step S1808, and then finishes processing. In this manner, when it is determined that configuration information is not required, the configuration information is acquired after completion of print processing.

Other Embodiments

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium).

While the embodiments of the present invention have been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-106260 filed May 6, 2010 which is hereby incorporated by reference herein in its entirety.

The invention claimed is:

1. A print control apparatus comprising:
   an output device specification processing unit configured to specify an output device when executing a print processing using a virtual printer driver; and
   a printer driver management processing unit configured to execute a preparation processing and an organizing processing for execution of print processing by the virtual printer driver; wherein:
   the printer driver management processing unit in the preparation processing acquires hardware information for the output device, searches for a matching printer driver based on the hardware information, and installs an actualizing printer driver identified by searching; and
   the printer driver management processing unit in the organizing processing determines whether configuration information for the output device is required using the installed actualizing printer driver, and when the configuration information for the output device is required, it is determined whether the configuration information has been acquired, and when the configuration information for the output device has not been acquired, the configuration information for the output device is acquired.

2. The print control apparatus according to claim 1, wherein the printer driver management processing unit determines whether configuration information for the output device is required based on the description in a markup language retained as a print setting.

3. The print control apparatus according to claim 1, wherein the printer driver management processing unit determines whether configuration information for the output device is required based on a return value when executing an inquiry on the object that functions the printer in relation to the actualizing printer driver.

4. The print control apparatus according to claim 1, wherein the printer driver management processing unit determines whether configuration information for the output device has been acquired based on the presence or the absence of a bi-directionally formatted file in the configuration files of the printer driver.

5. The print control apparatus according to claim 1, wherein the printer driver management processing unit determines whether configuration information for the output device has been acquired based on whether the configuration information is retained in the print control apparatus by the actualizing printer driver.

6. The print control apparatus according to claim 1, wherein the printer driver management processing unit acquires the configuration information for the output device through an external interface for acquiring the configuration information of the output device, the interface provided with the installed actualizing printer driver.

7. The print control apparatus according to claim 1, wherein the printer driver management processing unit opens the printer properties for the installed actualizing printer driver when acquiring configuration information for the output device, and provides a user with a screen for input of the configuration information for the output device.

8. The print control apparatus according to claim 1, wherein the printer driver management processing unit acquires configuration information for the output device after completion of the print processing, when it is determined that configuration information for the output device is not required.

9. A print control method comprising the steps of:
   specifying an output device when executing a print processing using a virtual printer driver; and
   executing a preparation processing and an organizing processing for execution of print processing by the virtual printer driver; wherein:

the preparation processing acquires hardware information for the output device, searches for a matching printer driver based on the hardware information, and installs an actualizing printer driver identified by searching; and the organizing processing determines whether configuration information for the output device is required using the installed actualizing printer driver, and when the configuration information for the output device is required, it is determined whether the configuration information has been acquired, and when the configuration information for the output device has not been acquired, the configuration information for the output device is acquired.

10. A non-transitory computer-readable storage medium storing a computer program for causing a computer to execute the print control method according to claim 9.

* * * * *